United States Patent
Ueshima

(10) Patent No.: US 9,522,543 B2
(45) Date of Patent: *Dec. 20, 2016

(54) IMAGE PROCESSING METHOD AND INKJET RECORDING APPARATUS

(71) Applicant: FUJIFILM Corporation, Tokyo (JP)

(72) Inventor: Masashi Ueshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,838

(22) Filed: Aug. 5, 2015

(65) Prior Publication Data

US 2016/0052300 A1    Feb. 25, 2016

(30) Foreign Application Priority Data

Aug. 21, 2014  (JP) ................. 2014-168521

(51) Int. Cl.
*B41J 2/21*       (2006.01)
*B41J 2/205*      (2006.01)
(Continued)

(52) U.S. Cl.
CPC ........... *B41J 2/2142* (2013.01); *B41J 2/205* (2013.01); *B41J 2/21* (2013.01); *B41J 2/2132* (2013.01);
(Continued)

(58) Field of Classification Search
CPC .................................................. B41J 2/2139
See application file for complete search history.

(56) References Cited

U.S. PATENT DOCUMENTS 6,990,249 B2   1/2006  Nomura
8,292,401 B2  10/2012  Sasayama
(Continued)

FOREIGN PATENT DOCUMENTS

EP   1267217 A2   12/2002
EP   1308279 A2    5/2003
(Continued)

OTHER PUBLICATIONS

Machine generated English translation of JP2004-230793, "Hue Controller for Printing Machine" to Nakamura et al.; retrieved via https://www.j-platpat.inpit.go.jp/web/all/top/BTmTopEnglishPage on May 6, 2016; 6 pp.*
(Continued)

*Primary Examiner* — Shelby Fidler
(74) *Attorney, Agent, or Firm* — Studebaker & Brackett PC

(57) ABSTRACT

An image processing method includes: forming an image for density unevenness measurement on a recording medium in a single-pass method, using an inkjet head in which nozzles are disposed in a main scanning direction; acquiring a density measurement value of each set gradation value from an image for density unevenness measurement before drying; converting the acquired density measurement value into a conversion density measurement value corresponding to a post-dry density measurement value, using a density measurement value conversion value set for each region in the main scanning direction; and deriving a new unevenness correction value using this conversion density measurement value.

5 Claims, 22 Drawing Sheets

(51) Int. Cl.
*B41J 29/393* (2006.01)
*B41J 11/00* (2006.01)
*H04N 1/60* (2006.01)
*H04N 1/401* (2006.01)

(52) U.S. Cl.
CPC ............ *B41J 2/2139* (2013.01); *B41J 2/2146* (2013.01); *B41J 11/002* (2013.01); *B41J 29/393* (2013.01); *H04N 1/4015* (2013.01); *H04N 1/605* (2013.01); *H04N 1/6033* (2013.01); *B41J 2029/3935* (2013.01)

(56) References Cited

U.S. PATENT DOCUMENTS

| | | | |
|---|---|---|---|
| 2002/0180996 A1 | 12/2002 | Allen et al. | |
| 2003/0086100 A1 | 5/2003 | Yashima et al. | |
| 2004/0032438 A1* | 2/2004 | Silverbrook | B41J 29/393 347/12 |
| 2005/0018219 A1 | 1/2005 | Senn et al. | |
| 2006/0262151 A1 | 11/2006 | Chiwata | |
| 2009/0244125 A1* | 10/2009 | Ozaki | B41F 33/00 347/9 |
| 2013/0021400 A1 | 1/2013 | Tamagawa | |
| 2013/0128286 A1* | 5/2013 | Tamagawa | G06K 15/02 358/1.2 |
| 2014/0354727 A1* | 12/2014 | Sasayama | G06K 15/027 347/15 |

FOREIGN PATENT DOCUMENTS

| | | |
|---|---|---|
| JP | 2000-238299 A | 9/2000 |
| JP | 2003-034055 A | 2/2003 |
| JP | 2003-136764 A | 5/2003 |
| JP | 2004230793 A * | 8/2004 |
| JP | 2005-007705 A | 1/2005 |
| JP | 2006-347164 A | 12/2006 |
| JP | 2013-056468 A | 3/2013 |
| WO | 2014/045849 A1 | 3/2014 |

OTHER PUBLICATIONS

The extended European search report issued by the European Patent Office on Mar. 13, 2015, which corresponds to European Patent Application No. 14169973.6-1903 and is related to U.S. Appl. Nos. 14/287,493 and 14/818,838.

An Office Action; "Notification of Reasons for Rejection," issued by the Japanese Patent Office on May 25, 2015, which corresponds to Japanese Patent Application No. 2013-111996 and is related to U.S. Appl. Nos. 14/287,493 and 14/818,838; with English language partial translation.

The extended European search report issued by the European Patent Office on Feb. 15, 2016, which corresponds to European Patent Application No. 15178902.1-1903 and is related to U.S. Appl. No. 14/818,838.

An Office Action "Notice of Reasons for Rejection" issued by the Japanese Patent Office on Aug. 30, 2016, which corresponds to Japanese Patent Application No. 2014-168521 and is related to U.S. Appl. No. 14/818,838; with English language translation.

* cited by examiner

IMAGE PROCESSING METHOD AND INKJET RECORDING APPARATUS

CROSS-REFERENCE TO RELATED APPLICATIONS

The present application claims priority under 35 U.S.C. §119 to Japanese Patent Application No. 2014-168521, filed on Aug. 21, 2014. The above application is hereby expressly incorporated by reference, in its entirety, into the present application.

BACKGROUND OF THE INVENTION

Field of the Invention

The present invention relates to an image processing method and program, and an inkjet recording apparatus, and particularly relates to a technique that corrects density unevenness of an image to be recorded.

Description of the Related Art

As an image recording apparatus that records an image on a recording medium, there is known an inkjet recording apparatus that ejects ink from an inkjet head. For example, a configuration including the inkjet head corresponding to each color of C (cyan), magenta (M), yellow (Y) and black (K) is adopted.

In an inkjet head, since there is dispersion in an ejection characteristic of each nozzle, correction processing is performed on image data by the use of a correction value to limit an influence due to the dispersion of the ejection characteristic of each nozzle.

For example, Japanese Patent Application Laid-Open No. 2000-238299 describes a printer that corrects print data by: printing a calibration pattern for density calibration on a print medium; detecting dispersion in an ink usage of each color ink from read data acquired by reading this by a reading apparatus; and adding correction to a color conversion table of corresponding element colors to solve this dispersion.

The printer described in Japanese Patent Application Laid-Open No. 2000-238299 is configured so as to: anticipate the time at which each color ink is fixed on a print medium; acquire deviation from the reference value of the usage of each color ink; correct print data so as to solve this deviation; and correct the gap of color balance more accurately.

SUMMARY OF THE INVENTION

Generally, in image reading using an imaging element such as an image sensor, illumination light is irradiated to an image from a slope direction such that a specular reflection element of illumination light does not directly enter into the image sensor. Therefore, a light scattering element of the image chiefly enters into the image sensor.

In a state where ink on a recording medium is not sufficiently dry immediately after printing or in a state where the ink is not sufficiently fixed on the recording medium, light scattering on an ink surface relatively becomes small (the specular reflection element becomes large). By contrast with this, in a state where the ink on the recording medium is sufficiently dry or in a state where the ink is sufficiently fixed on the recording medium, the light scattering on the ink surface relatively becomes large. Thus, even if the same image is read out, the quantity of light entered into the image sensor becomes smaller as a whole in a state where ink is undried or unfixed than a state after the drying or fixing of the ink progresses, and a change in the quantity of light which is entered and reflects the difference in the ink amount becomes small.

Therefore, in a state where ink is undried or unfixed, it is difficult to accurately detect a difference in the ink amount such as density unevenness of an image from a readout result, and the measurement accuracy of the ink amount decreases.

The present invention is made in view of such circumstances, and it is an object to provide an image processing method and program and an inkjet recording apparatus that perform unevenness correction taking into account a difference in the density measurement value before and after the drying of each region influenced by the dispersion of the ink ejection amount and the dispersion of drying conditions.

One mode of an image processing method to achieve the above-mentioned object includes: a density unevenness measurement image formation step of forming an image for density unevenness measurement on a recording medium in a single-pass method, using an inkjet head in which nozzles are disposed in a main scanning direction, based on image data on which unevenness correction processing is performed using a preset unevenness correction value; a density measurement value acquisition step of acquiring a density measurement value for each set gradation value of the image for density unevenness measurement and each of the nozzles, before the image for density unevenness measurement is dried; a density measurement value conversion step of converting the acquired density measurement value into a conversion density measurement value corresponding to a post-dry density measurement value, using a density measurement value conversion value showing a conversion relationship of a density measurement value for each set gradation value before and after drying and each of multiple regions in the main scanning direction; and an unevenness correction value derivation step of deriving a new unevenness correction value using the conversion density measurement value.

According to this mode, the acquired density measurement value is converted into the conversion density measurement value corresponding to the post-dry density measurement value by the use of the density measurement value conversion value showing the conversion relationship of the density measurement value for each set gradation value before and after drying and each of multiple regions in the main scanning direction, a new unevenness correction value is derived using this conversion density measurement value, and therefore it is possible to perform unevenness correction excluding an influence of the dispersion of an ink ejection amount and the dispersion of drying conditions.

It is preferable that, in the density measurement value conversion step, the density measurement value conversion value showing the conversion relationship of the density measurement value for each set gradation value before and after drying and each of the multiple regions in the main scanning direction is added to the acquired density measurement value, and conversion into the conversion density measurement value corresponding to the post-dry density measurement value is performed. By this means, it is possible to reduce the influence of noise and perform conversion into the conversion density measurement value.

It is preferable to include: a density measurement image formation step of forming an image for density measurement of each set gradation value on a recording medium in a single-pass method, using the inkjet head, based on image data on which unevenness correction processing is performed using a preset unevenness correction value; a pre-dry density measurement value acquisition step of acquiring a pre-dry density measurement value of each set gradation value of the image for density measurement before the image for density measurement is dried; a drying step of drying the image for density measurement; a post-dry density measurement value acquisition step of acquiring a post-dry density measurement value of each set gradation value of the image for density measurement after the image for density measurement is dried; and a density measurement value conversion value calculation step of calculating a density measurement value conversion value of each set gradation value for each of the multiple regions in the main scanning direction, based on the pre-dry density measurement value and the post-dry density measurement value. By this means, it is possible to appropriately acquire the density measurement value conversion value of each region.

Multiple regions in the main scanning direction may be regions of the nozzles respectively. By this means, it is possible to perform unevenness correction excluding the influence of the dispersion of each nozzle.

To achieve the above-mentioned object, one mode of an image processing method includes: a density unevenness measurement image formation step of forming an image for density unevenness measurement on a recording medium by an inkjet head that ejects ink from nozzles, based on image data on which unevenness correction processing is performed using a preset unevenness correction value; a density measurement value acquisition step of acquiring a density measurement value for each set gradation value of the image for density unevenness measurement and each of the nozzles, before the image for density unevenness measurement is dried; a density measurement value conversion step of adding a density measurement value conversion value showing a conversion relationship of a density measurement value of the each set gradation value before and after drying, to the acquired density measurement value, and performing conversion into a conversion density measurement value corresponding to a post-dry density measurement value; and an unevenness correction value derivation step of deriving a new unevenness correction value using the conversion density measurement value.

According to this mode, it is possible to reduce the influence of noise and perform conversion into the conversion density measurement value.

It is preferable to include: a density measurement image formation step of forming an image for density measurement of each set gradation value on a recording medium, using the inkjet head, based on image data on which unevenness correction processing is performed using a preset unevenness correction value; a pre-dry density measurement value acquisition step of acquiring a pre-dry density measurement value of each set gradation value of the image for density measurement before the image for density measurement is dried; a drying step of drying the image for density measurement; a post-dry density measurement value acquisition step of acquiring a post-dry density measurement value of each set gradation value of the image for density measurement after the image for density measurement is dried; and a density measurement value conversion value calculation step of calculating a density measurement value conversion value of each set gradation value, based on a difference between the pre-dry density measurement value and the post-dry density measurement value. By this means, it is possible to acquire the density measurement value conversion value in which the influence of noise is appropriately reduced.

To achieve the above-mentioned object, one mode of an image processing method includes: a density unevenness measurement image formation step of forming an image for density unevenness measurement on a recording medium in a single-pass method, using an inkjet head in which nozzles are disposed in a main scanning direction, based on image data on which unevenness correction processing is performed using a preset unevenness correction value, and performing defect correction on the image data using a correction nozzle adjacent to a defective nozzle; a density measurement value acquisition step of acquiring a density measurement value for each set gradation value of the image for density unevenness measurement and each of the nozzles, before the image for density unevenness measurement is dried; a density measurement value conversion step of converting the acquired density measurement value into a conversion density measurement value corresponding to a post-dry density measurement value, using a defect correction unit density measurement value conversion value for a nozzle that corresponds to the correction nozzle and a non-defect correction unit density measurement value conversion value for a nozzle that does not correspond to the correction nozzle, where the defect correction unit density measurement value conversion value and the non-defect correction unit density measurement value conversion value show a conversion relationship of the density measurement value of each set gradation value before and after drying and each of the nozzles; and an unevenness correction value derivation step of deriving a new unevenness correction value using the conversion density measurement value.

According to this mode, the acquired density measurement value is converted into the conversion density measurement value corresponding to the post-dry density measurement value by the use of the defect correction unit density measurement value conversion value for the nozzle that corresponds to the correction nozzle to perform defect correction and the non-defect correction unit density measurement value conversion value for the nozzle that does not correspond to the correction nozzle, and therefore it is possible to perform unevenness correction excluding an influence of the dispersion of an ink ejection amount and the dispersion of drying conditions without depending on the existence/non-existence of defect correction.

It is preferable to include: a density measurement image formation step of forming an image for density measurement of each set gradation value on a recording medium in a single-pass method, using the inkjet head, based on image data on which unevenness correction processing is performed using a preset unevenness correction value, causing a predefined imitation defective nozzle not to eject ink and causing imitation correction nozzles adjacent to the imitation defective nozzle to eject ink of density for defective correction; a pre-dry density measurement value acquisition step of acquiring a pre-dry density measurement value of each set gradation value of the image for density measurement before the image for density measurement is dried; a drying step of drying the image for density measurement; a post-dry density measurement value acquisition step of acquiring a post-dry density measurement value of each set gradation value of the image for density measurement after the image for density measurement is dried; and a defect correction unit density measurement value conversion value calculation step of calculating a defect correction unit density measurement value conversion value of each set gradation value for each of the imitation correction nozzles, based on the pre-dry density measurement value and the post-dry density measurement value. By this means, it is possible to appropriately acquire the defect correction unit density measurement value conversion value.

Moreover, it is preferable to include: a density measurement image formation step of forming an image for density measurement of each set gradation value on a recording medium in a single-pass method, using the inkjet head, based on image data on which unevenness correction processing is performed using a preset unevenness correction value; a pre-dry density measurement value acquisition step of acquiring a pre-dry density measurement value of each set gradation value of the image for density measurement before the image for density measurement is dried; a drying step of drying the image for density measurement; a post-dry density measurement value acquisition step of acquiring a post-dry density measurement value of each set gradation value of the image for density measurement after the image for density measurement is dried; and a non-defect correction unit density measurement value conversion value calculation step of calculating a non-defect correction unit density measurement value conversion value of each set gradation value for each of the nozzles, based on the pre-dry density measurement value and the post-dry density measurement value. By this means, it is possible to appropriately acquire the non-defect correction unit density measurement value conversion value.

It is preferable that, in the density measurement value conversion step, the defect correction unit density measurement value conversion value is added to the acquired density measurement value for a nozzle that corresponds to the correction nozzle, the non-defect correction unit density measurement value conversion value is added to the acquired density measurement value for a nozzle that does not correspond to the correction nozzle, and conversion into a conversion density measurement value corresponding to a post-dry density measurement value is performed, where the defect correction unit density measurement value conversion value and the non-defect correction unit density measurement value conversion value show a conversion relationship of the density measurement value of each set gradation value before and after drying and each of the nozzles. By this means, it is possible to convert an appropriate conversion density measurement value according to whether to correspond to a correction nozzle.

A program that causes a computer to execute steps of the image processing method of each mode and a non-transitory computer-readable recording medium storing the program are included in the technical scope of the present invention.

To achieve the above-mentioned object, one mode of an inkjet recording apparatus includes: an inkjet head in which nozzles are disposed in a main scanning direction; a movement device configured to relativity move the inkjet head and a recording medium in a sub-scanning direction being intersect with (orthogonal to) the main scanning direction; a recording control device configured to relatively move the recording medium with respect to the inkjet head only once, eject ink from the nozzles of the inkjet head, records an image on the recording medium and form an image for density unevenness measurement based on image data on which unevenness correction processing is performed using a preset unevenness correction value; a density measurement value acquisition device configured to acquire a density measurement value for each set gradation value of the image for density unevenness measurement and each of the nozzles, before the image for density unevenness measurement is dried; a density measurement value conversion device configured to convert the acquired density measurement value into a conversion density measurement value corresponding to a post-dry density measurement value, using a density measurement value conversion value showing a conversion relationship of the density measurement value for each set gradation value before and after drying and each of multiple regions in the main scanning direction; an unevenness correction value derivation device configured to derive a new unevenness correction value using the conversion density measurement value; and a storage device configured to store the new unevenness correction value.

According to this mode, the acquired density measurement value is converted into the conversion density measurement value corresponding to the post-dry density measurement value by the use of the density measurement value conversion value showing the conversion relationship of the density measurement value for each set gradation value before and after drying and each of multiple regions in the main scanning direction, a new unevenness correction value is derived using this conversion density measurement value, and therefore it is possible to perform unevenness correction excluding the influence of the dispersion of an ink ejection amount and the dispersion of drying conditions.

To achieve the above-mentioned object, one mode of an inkjet recording apparatus includes: an inkjet head configured to eject ink from nozzles; a density unevenness measurement image formation device configured to form an image for density unevenness measurement on a recording medium, using the inkjet head, based on image data on which unevenness correction processing is performed using a preset unevenness correction value; a density measurement value acquisition device configured to acquire a density measurement value for each set gradation value of the image for density unevenness measurement and each of the nozzles, before the image for density unevenness measurement is dried; a density measurement value conversion device configured to add a density measurement value conversion value showing a conversion relationship of a density measurement value of the each set gradation value before and after drying, to the acquired density measurement value, and perform conversion into a conversion density measurement value corresponding to a post-dry density measurement value; an unevenness correction value derivation device configured to derive a new unevenness correction value using the conversion density measurement value; and a storage device configured to store the new unevenness correction value.

According to this mode, it is possible to reduce the influence of noise and perform conversion into the conversion density measurement value.

To achieve the above-mentioned object, one mode of an inkjet recording apparatus includes: an inkjet head in which multiple nozzles are disposed in a main scanning direction; a movement device configured to relativity move the inkjet head and a recording medium in a sub-scanning direction being intersect with (orthogonal to) the main scanning direction; a defective nozzle correction device configured to perform defect correction on a defective nozzle, using a correction nozzle adjacent to a defective nozzle among the multiple nozzles; a recording control device configured to relatively move the recording medium with respect to the inkjet head only once, eject ink from the nozzles of the inkjet head, record an image on the recording medium and form an image for density unevenness measurement based on image data on which unevenness correction processing is performed using a preset unevenness correction value; a density measurement value acquisition device configured to acquire a density measurement value for each set gradation value of the image for density unevenness measurement and each of the nozzles, before the image for density unevenness measurement is dried; a density measurement value conversion device configured to convert the acquired density measurement value into a conversion density measurement value corresponding to a post-dry density measurement value, using a density measurement value conversion value which shows a conversion relationship of the density measurement value for the each set gradation value before and after drying and each of the nozzles and which has a different value depending on whether to correspond to the correction nozzle; an unevenness correction value derivation device configured to derive a new unevenness correction value using the conversion density measurement value; and a storage device configured to store the new unevenness correction value.

According to this mode, the acquired density measurement value is converted into the conversion density measurement value corresponding to the post-dry density measurement value by the use of the defect correction unit density measurement value conversion value for the nozzle that corresponds to the correction nozzle to perform defect correction and the non-defect correction unit density measurement value conversion value for the nozzle that does not correspond to the correction nozzle, and therefore it is possible to perform unevenness correction excluding an influence of the dispersion of an ink ejection amount and the dispersion of drying conditions without depending on the existence/non-existence of defect correction.

According to the present invention, it is possible to perform unevenness correction taking into account a difference in a density measurement value before and after the drying of each region.

DETAILED DESCRIPTION OF THE EXEMPLARY EMBODIMENTS

In the following, preferred embodiments of the present invention are described in detail according to the accompanying drawings.

<First Embodiment>

[Configuration of Image Recording Apparatus]

Figure 1:
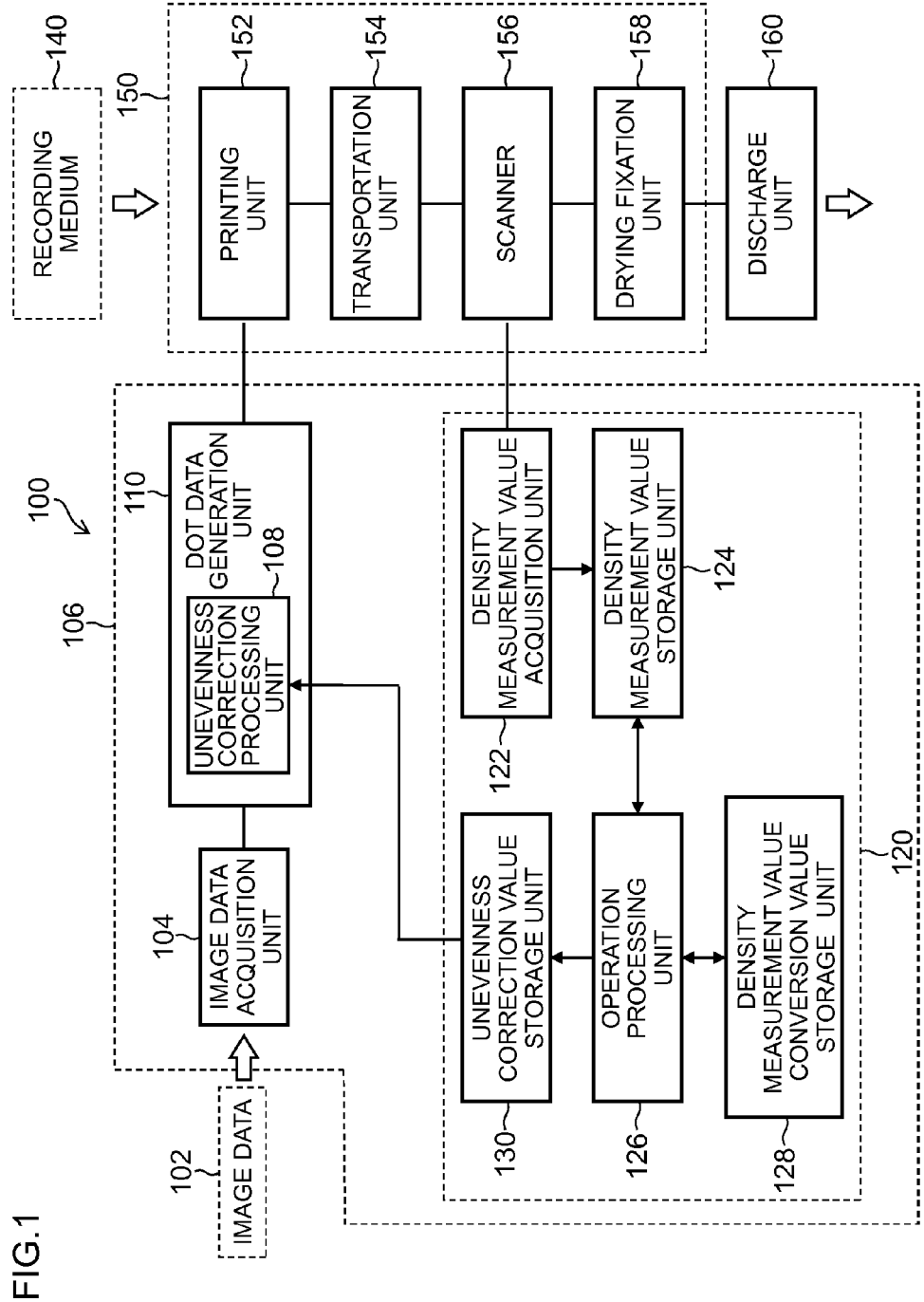
FIG. 1 is a block diagram illustrating a schematic configuration of an image recording device 100.

An inkjet recording apparatus 100 (one example of an image recording apparatus) illustrated in FIG. 1 is an inkjet printer of a single-pass method and includes an image data acquisition unit 104 that acquires image data 102 that is print image data showing a print image, a dot data generation unit 110 that generates dot data on the basis of input image data, and an image recording unit 150 that prints (records) an image on a recording medium 140 on the basis of the generated dot data.

The image data 102 is data of a raster format (raster data) for each color of RGB.

The image data acquisition unit 104 acquires the image data 102 through an input interface (not illustrated). Moreover, the image data 102 stored in a memory (not illustrated) such as a ROM (Read Only Memory) beforehand may be read out and acquired.

An image processing unit 106 (one example of an image processing apparatus) includes the dot data generation unit 110 and an unevenness correction value generation unit 120.

The dot data generation unit 110 includes: a color conversion processing unit (not illustrated) that converts image data expressed by C, M, Y and K corresponding to ink colors of the image data 102 expressed by red (R), green (G) and blue (B); a color separation (classification) processing unit (not illustrated) that separates multi-tone image data expressed by C, M, Y and K into the multi-tone image data of each color; an unevenness correction processing unit 108 that performs unevenness correction processing on the multi-tone image data of each color by the use of an unevenness correction value; and a halftone processing unit (not illustrated) that performs halftone processing on the multi-tone image data of each color after the unevenness correction processing. The dot data generation unit 110 generates the dot data of each nozzle on the basis of the acquired image data 102 and outputs it to the image recording unit 150.

Meanwhile, the unevenness correction value generation unit 120 includes: a density measurement value acquisition unit 122 that acquires a density measurement value; a density measurement value storage unit 124 that stores the acquired density measurement value; an operation processing unit 126 that calculates an unevenness correction value, and so on; a density measurement value conversion value storage unit 128 that stores a density measurement value conversion value; and an unevenness correction value storage unit 130 that stores an unevenness correction value.

The unevenness correction value generation unit 120 generates the unevenness correction value of each nozzle 212 of the inkjet head 200 and stores the generated unevenness correction value in the unevenness correction value storage unit 130. The unevenness correction processing unit 108 of the dot data generation unit 110 reads out the unevenness correction value stored in the unevenness correction value storage unit 130 of the unevenness correction value generation unit 120 and performs unevenness correction processing on the multi-tone image data of each color on the basis of the read unevenness correction value.

The image recording unit 150 includes: a printing unit 152 that prints an image on the recording medium 140; a transportation unit 154 that transports the recording medium 140 from the printing unit 152 and to a scanner 156; the scanner 156 that reads the image printed on the recording medium 140; a drying fixation unit 158 that performs drying processing and fixation processing on the recording medium 140 after readout processing by the scanner 156; and a discharge unit 160 that discharges the recording medium 140 subjected to the drying processing and the fixation processing.

The printing unit 152 includes the inkjet head 200 (see FIG. 2) corresponding to each color of C, M, Y and K, and a record control unit (one example of a record control device) that controls the inkjet head 200 and records an image. The printing unit 152 controls the inkjet head 200 on the basis of dot data input in the record control unit, and prints a print image on the recording surface of the recording medium 140 transported by the transportation unit 154 (one example of relative movement).

The transportation unit 154 fixes and holds the recording medium 140 and transports it from the printing position of the printing unit 152 to the readout position of the scanner 156. The transportation of the recording medium 140 by the transportation unit 154 is performed in a short period in which the drying and fixation of the image printed on the recording medium 140 do not progress.

The scanner 156 (one example of a density measurement value acquisition device) is formed including an image sensor that reads the image printed on the recording medium 140. As the image sensor, a line sensor may be used and an area sensor may be used.

The drying fixation unit 158 dries the image printed on the recording surface of the recording medium 140 by ventilation and heating, and so on, and fixes the image to the recording surface of the recording medium 140 by heating and pressurization, and so on.

The discharge unit 160 discharges the recording medium 140 subjected to drying processing and fixation processing by the drying fixation unit 158 to the outside of the apparatus.

The image processing unit 106 may be formed as a single image processing apparatus and may be combined with the image recording unit 150 to form the inkjet recording apparatus 100.

If image reading is performed after ink is dried and fixed, there does not occur a problem that the quantity of light entered into an image sensor in a state where the ink is undried and unfixed becomes small. However, since it is necessary to fix and hold a recording medium at the time of printing or reading by the image sensor, in a case where an apparatus configuration in which a drying fixation unit is disposed immediately after a printing unit and the image sensor is disposed on the downstream side thereof is adopted, it is assumed that a device to fix and hold the recording medium at the time of printing and a device to fix and hold the recording medium at the time of reading are individually included. As a result, as compared with an apparatus configuration in which the image sensor is disposed immediately after the printing unit, the apparatus size (apparatus scale) becomes large.

In the present embodiment, only the transportation unit 154 is provided as a device that fixes and holds the recording medium 140 and transports it for the printing unit 152 that performs printing and the scanner 156 that reads a print image, and the expansion of the apparatus size is prevented.

[Configuration of Inkjet Head]

Figure 2:
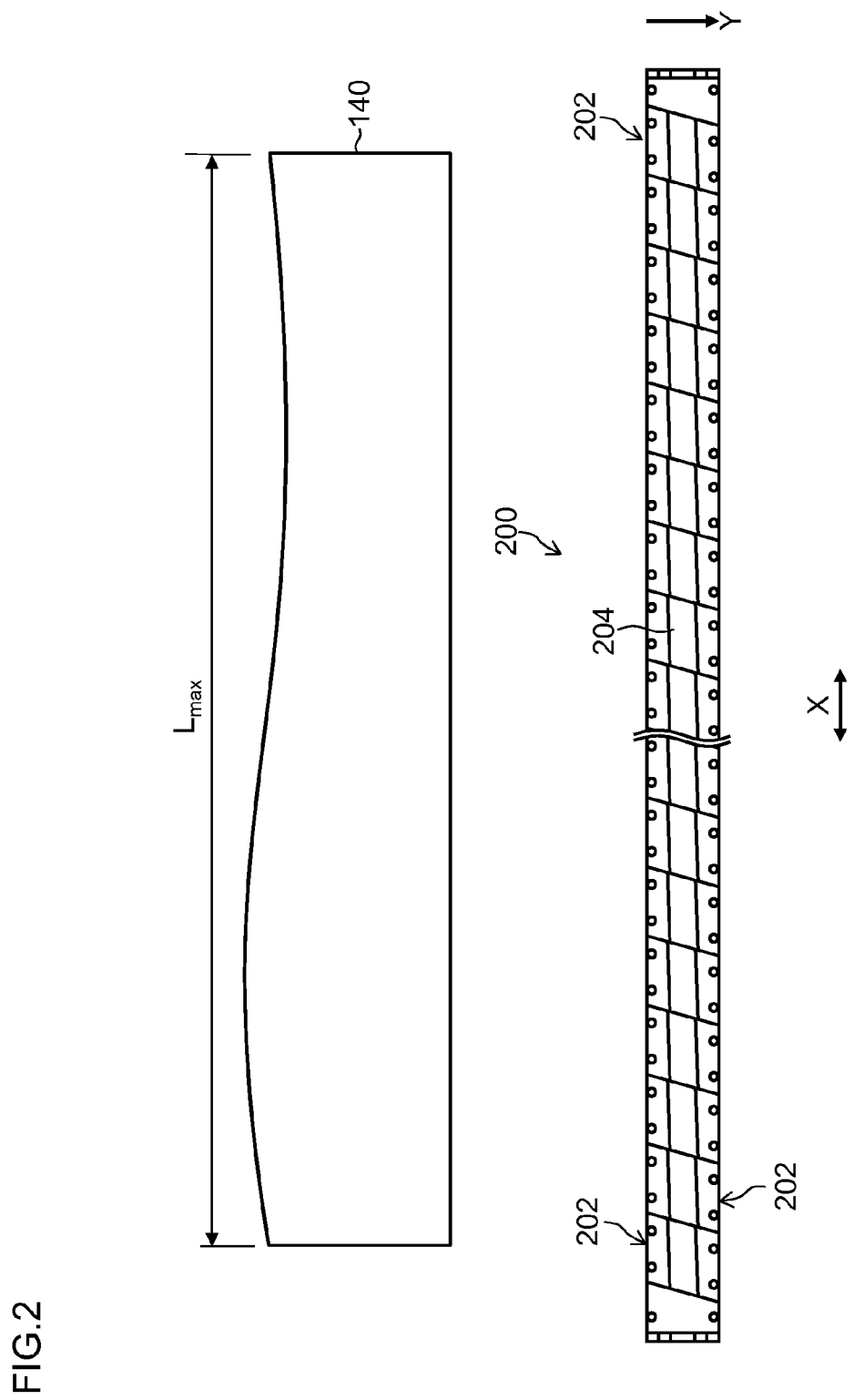
FIG. 2 is a plan view illustrating a schematic configuration of an inkjet head 200.

FIG. 2 is a plan view illustrating a schematic configuration of the inkjet head 200 used in the printing unit 152. The printing unit 152 illustrated in FIG. 1 includes four inkjet heads 200 corresponding to each color of C, M, Y and K. Here, the configurations of four inkjet heads are common.

The inkjet head 200 illustrating in FIG. 2 has a structure to join n head modules 202 in the width direction (X direction or main scanning direction) orthogonal to the relative transportation direction (Y direction or sub-scanning direction) of the recording medium 140. Here, "orthogonal" includes a mode that causes an operational effect similar to the case of intersection with an angle of substantially 90 degrees among modes for intersection with an angle less than 90 degrees or an angle over 90 degrees.

Moreover, a plurality of nozzles 212 (see FIG. 3) are disposed on a nozzle surface 204 of each head module 202. That is, the inkjet head 200 is a full-line-type inkjet head in which the plurality of nozzles 212 are disposed over length corresponding to the total length in the X direction of the recording medium 140.

Figure 3:
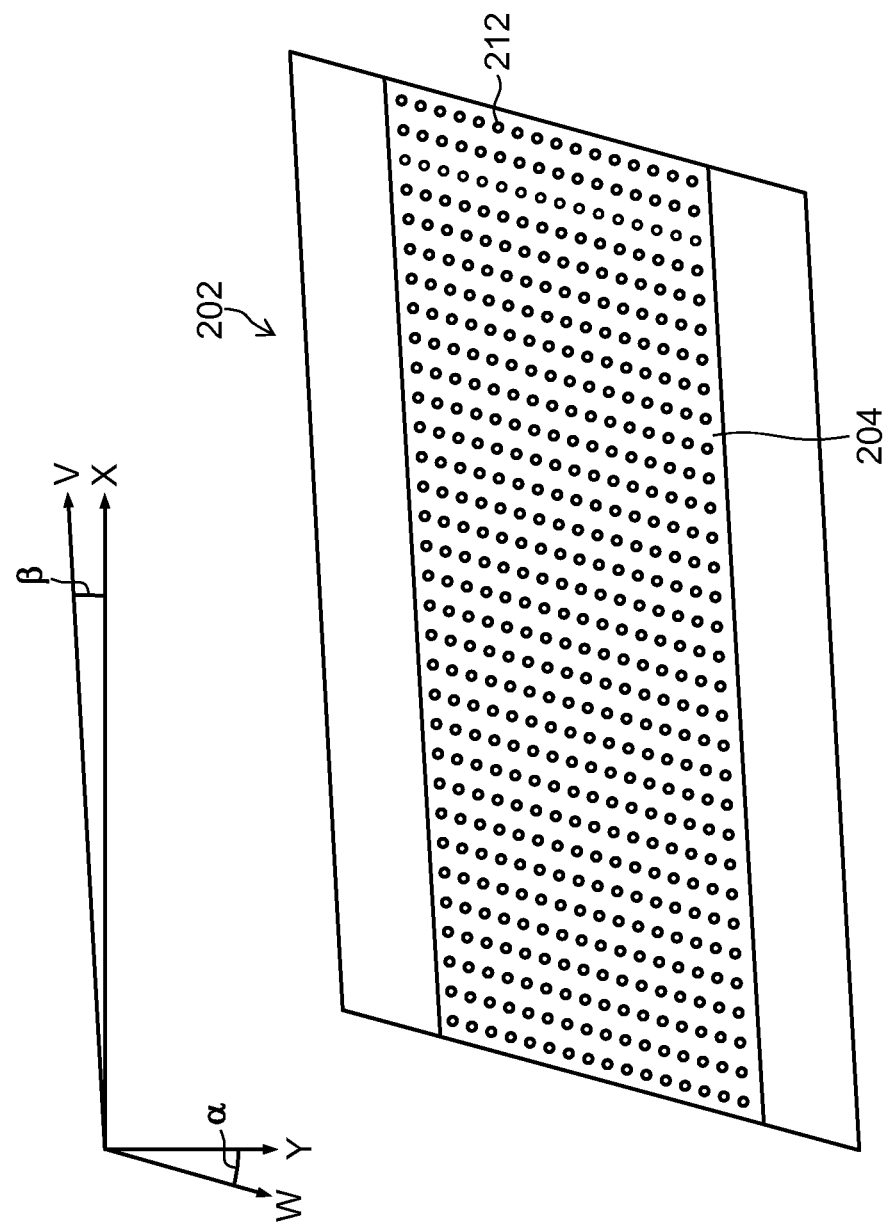
FIG. 3 is a plan perspective view of a nozzle surface in a head module 202.

As illustrated in FIG. 3, the head module 202 has the planar shape of a parallelogram formed with: an edge surface on the long-side side along the V direction having a slope of angle β with respect to the X direction; and an edge surface on the short-side side along the W direction having a slope of angle α with respect to the Y direction. The plurality of nozzles 212 are disposed on the nozzle surface 204 in the row direction along the V direction and the column direction along the W direction. Here, the disposition of the nozzles 212 is not limited to the mode illustrated in FIG. 3, and the plurality of nozzles 212 may be disposed in the row direction along the X direction and the column direction that diagonally intersects with the X direction.

As for the head module 202 in which the nozzles 212 are disposed in a matrix manner, the nozzles 212 are disposed at regular intervals in the X direction in a projection nozzle array disposed such that the nozzles 212 are arranged in the X direction. That is, the X direction is a substantial disposition direction of the nozzles, and the interval in the X direction of the nozzles 212 of this projection nozzle array becomes record resolution in the X direction of the inkjet head 200.

The inkjet head 200 (head module 202) includes a pressure chamber that communicates with the nozzles 212 and a supply channel that communicates with the pressure chamber through a supply port though their illustration is omitted. When ink is ejected from the nozzles 212, the ink is filled from the supply channel to the pressure chamber through the supply port.

As an ink ejection method of the inkjet head 200, a piezo-electric method using the deflection deformation of piezoelectric elements may be applied and a thermal method using a film boiling phenomenon of ink may be applied. In the piezo-electric method, when a driving voltage is applied to the piezoelectric elements, the volume of the pressure chamber decreases according to the deflection deformation of piezoelectric elements and ink corresponding to the volume reduction of the pressure chamber is ejected from the nozzles 212.

Moreover, in the thermal method, air bubbles are generated by heating ink in the pressure chamber, and ink corresponding to the volume of the pressure chamber is ejected from the nozzles 212.

[Density Measurement Value Conversion Value Calculation Processing]

Figure 4:
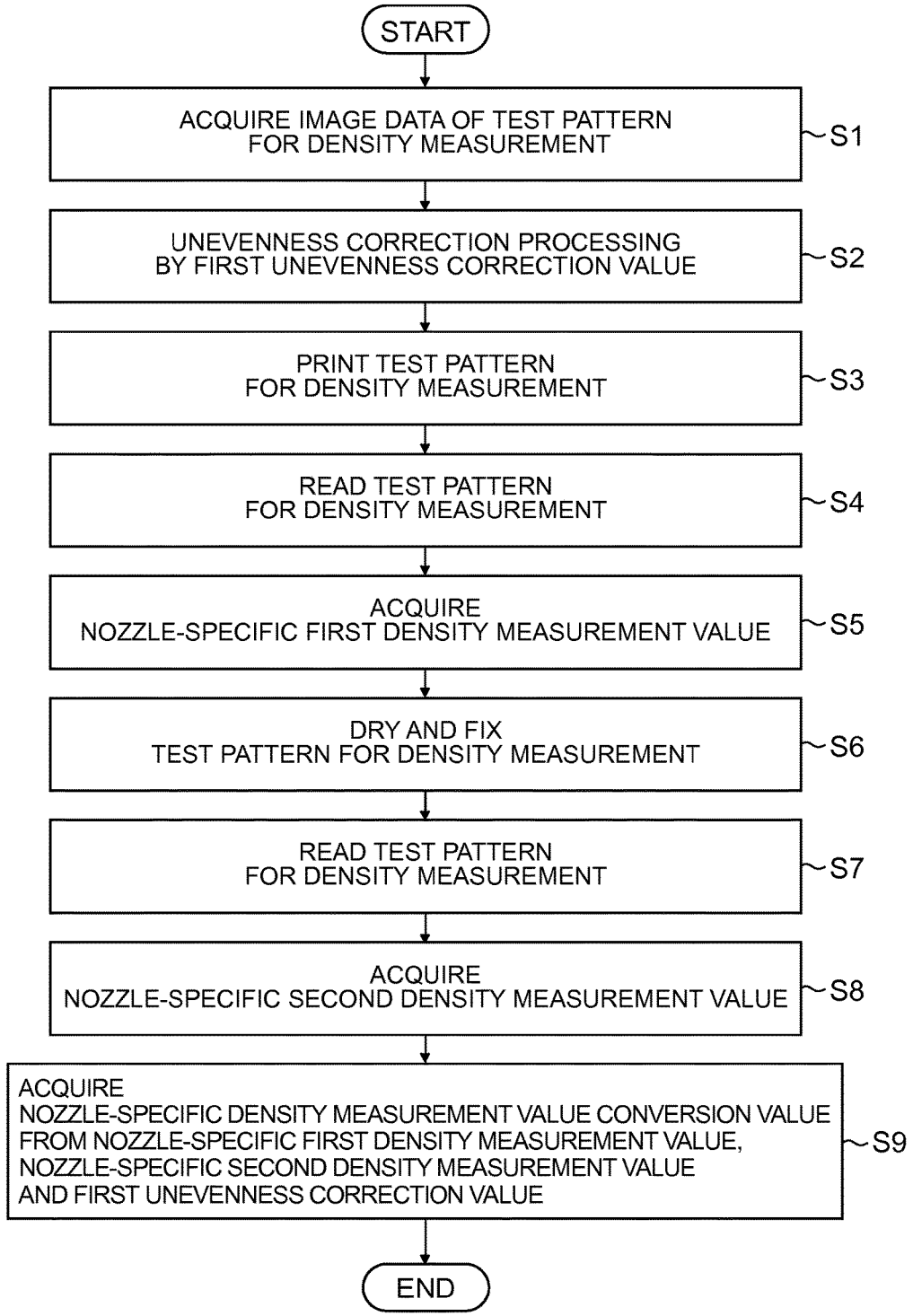
FIG. 4 is a flowchart illustrating processing that calculates a density measurement value conversion value.

Next, calculation processing of a density measurement value conversion value stored by the density measurement value conversion value storage unit 128 is described using the flowchart in FIG. 4. The density measurement value conversion value shows the conversion relationship between the density measurement value before the drying fixation of a print image and the density measurement value after the drying fixation. By performing conversion processing using the density measurement value conversion value on the density measurement value of an image before the drying fixation, it is possible to convert it into the density measurement value after the drying fixation. The density measurement value conversion value according to the present embodiment is the nozzle-specific density measurement value conversion value, which is calculated for each nozzle 212.

Here, the nozzle-specific density measurement value conversion value is calculated for each of four inkjet heads 200 corresponding to each color of C, M, Y and K, but calculation processing of the nozzle-specific density measurement value conversion value of one inkjet head 200 is described here.

As for the calculation of the nozzle-specific density measurement value conversion value, first, the image processing unit 106 acquires image data of a test pattern for density measurement in the image data acquisition unit 104 (step S1).

Figure 5:
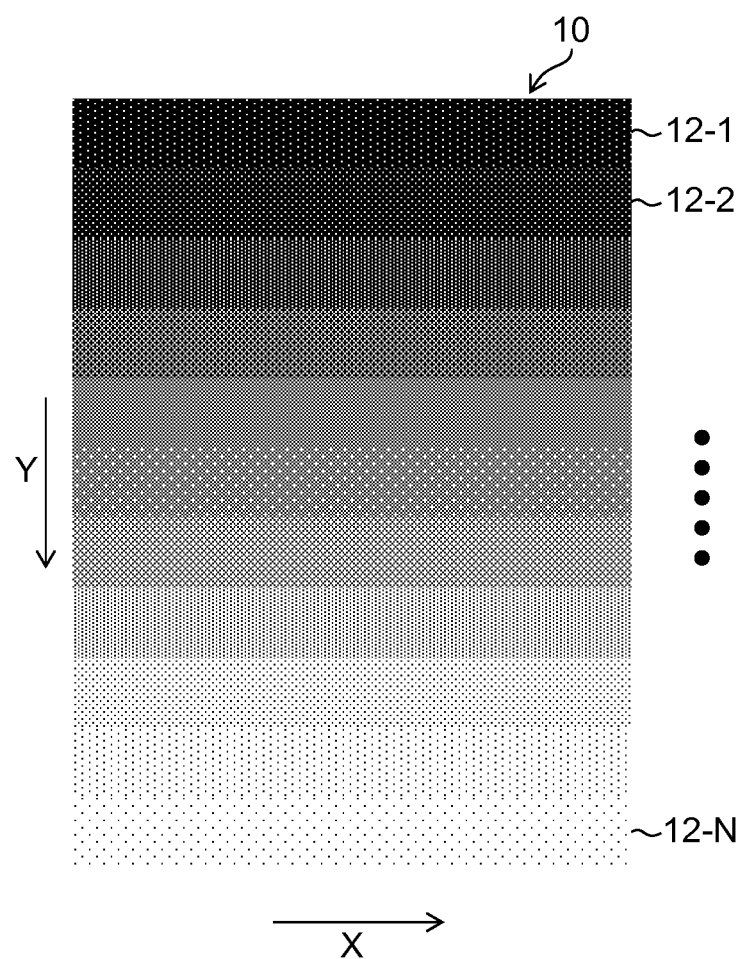
FIG. 5 is a diagram illustrating image data of a test pattern for density measurement.

As illustrated in FIG. 5, image data 10 of the test pattern for density measurement has a constant test chart gradation value (set gradation value) in the X direction and includes N stages of density patches 12-1, 12-2 . . . 12-N having a predetermined width in the Y direction. In the image data 10, respective density patches 12-1, 12-2 . . . 12-N are disposed in the gradation value order from the density patch 12-1 with test chart gradation value $G_1$ of the highest gradation value to the density patch 12-N with test chart gradation value $G_N$ of the lowest gradation value, but the disposition of the density patches is not limited to this.

Next, the image processing unit 106 reads out the first unevenness correction value that is the latest unevenness correction value from an unevenness correction value storage unit 130 in the unevenness correction processing unit 108, and performs unevenness correction processing on the image data 10 of the test pattern for density measurement on the basis of the read first unevenness correction value (step S2). The first unevenness correction value is a correction value used for operation to correct the unevenness of each nozzle 212 of a print image, and is stored in the unevenness correction value storage unit 130 for each nozzle 212 of the inkjet head 200 of each color and for each set gradation value. In the present embodiment, the unevenness correction processing unit 108 multiplies the first unevenness correction value of each nozzle 212 by test chart gradation value $G_1$, test chart gradation value $G_2$ . . . test chart gradation value $G_N$ of respective density patches 12-1, 12-2 . . . 12-N, and performs unevenness correction processing for each nozzle 212.

Figure 6A:
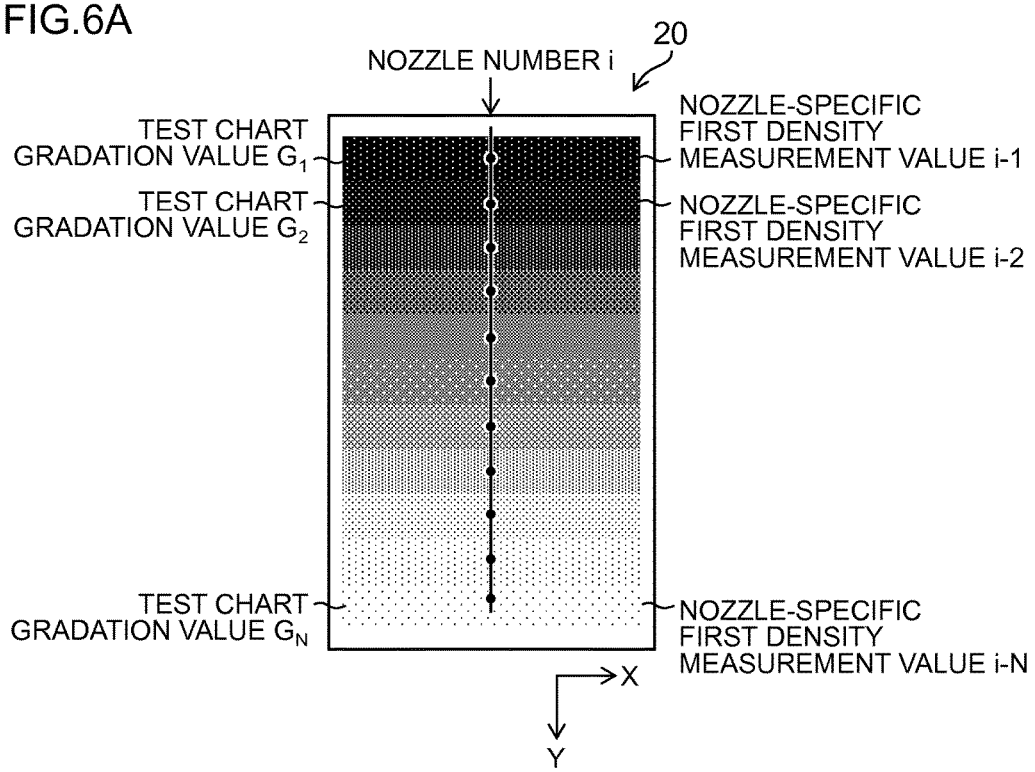
FIGS. 6A and 6B are explanatory diagrams of a density measurement value before and after drying fixation applied to calculate a density conversion value measurement value.

Based on the image data 10 of the test pattern for density measurement subjected to this unevenness correction processing, an image 20 of the test pattern for density measurement (one example of an image for density measurement) is printed on the recording medium 140 by the inkjet head 200 of the printing unit 152 (step S3, which is one example of a density measurement image formation step). FIG. 6A illustrates the image 20 of the test pattern for density measurement, which is recorded in the recording medium 140. Ink is ejected from all nozzles 212 of one inkjet head 200 to the recording medium 140 transported in the Y direction and this image 20 of the test pattern for density measurement is printed in scanning once. Therefore, the length in a direction orthogonal to the paper transportation direction of each density patch is equal to list width of the projection nozzle.

Next, the image 20 of the test pattern for density measurement, which is printed on the recording medium 140, is read by the scanner 156 (step S4). The read image 20 of the test pattern for density measurement here is in a state before the drying fixation by the drying fixation unit 158. Here, a scanner installed separately from the inkjet recording apparatus 100 may be used for the reading of this image before the drying fixation.

Based on the read value of the scanner 156 in step S4, the image processing unit 106 acquires the density measurement value for each test chart gradation value and each nozzle 212 of the inkjet head 200 as the nozzle-specific first density measurement value (one example of a pre-dry density measurement value) in the density measurement value acquisition unit 122 (step S5, which is one example of a pre-dry density measurement value acquisition step). That is, the nozzle-specific first density measurement value is acquired for each nozzle 212 from the read values of respective density patches 12-1, 12-2 . . . 12-N of the image 20. FIG. 6A illustrates one example of the acquisition of nozzle-specific first density measurement value i–1, nozzle-specific first density measurement value i–2 . . . nozzle-specific first density measurement value i-N of nozzle number i among the plurality of nozzles 212 of the inkjet head 200.

The incident light quantity of an image sensor of a scanner becomes smaller when the density of an image becomes higher, and an output signal of the image sensor indicates a smaller value. By contrast, the incident light quantity of the image sensor becomes larger when the density of the image becomes lower, and the output signal of the image sensor indicates a larger value. Therefore, the magnitude relationship of the output signal of the image sensor is reversed here and assumed as a density measurement value. The density measurement value acquisition unit 122 stores this nozzle-specific first density measurement value in the density measurement value storage unit 124.

Figure 6B:
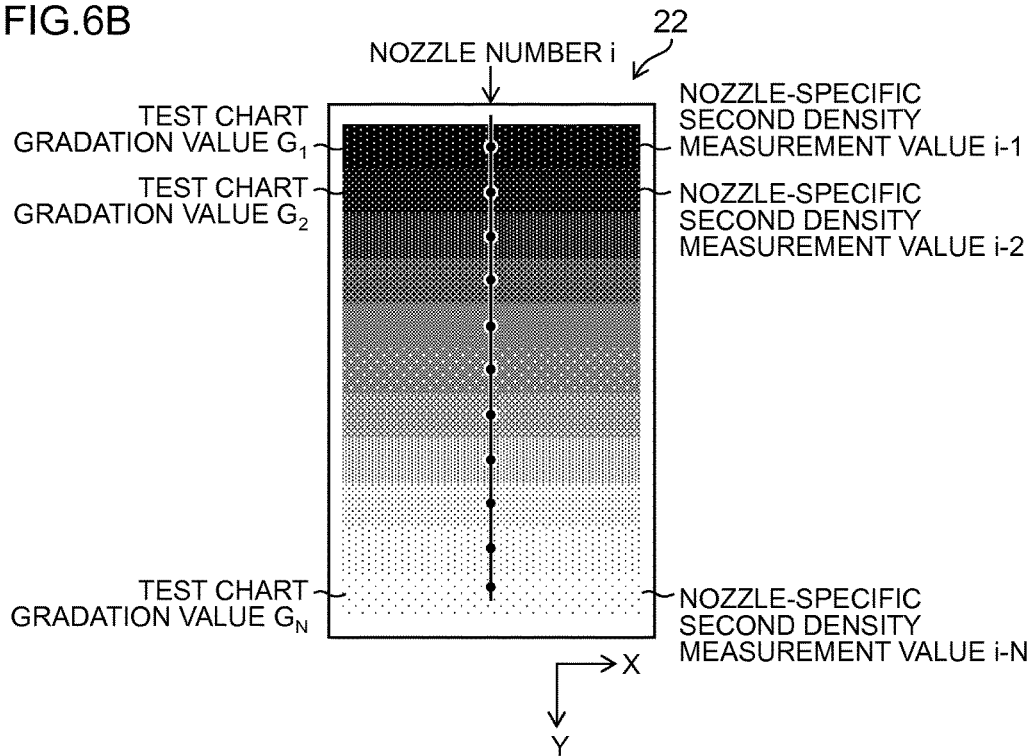

Next, the image 20 of the test pattern for density measurement, which is printed on the recording medium 140, is dried and fixed by the drying fixation unit 158 (step S6, which is one example of a drying step). FIG. 6B illustrates an image 22 of the test pattern for density measurement in which the image 20 of the test pattern for density measurement is dried and fixed. Here, as drying fixation processing, transportation for a long term until an image of the test pattern for density measurement enters a drying fixation state may be applied.

This image 22 of the test pattern for density measurement is read by the scanner 156 (step S7). As for this reading of the image after the drying fixation, a scanner installed separately from the inkjet recording apparatus 100 may be used.

The image processing unit 106 reverses the read value of the scanner 156 in step S7 in the density measurement value acquisition unit 122, and acquires the density measurement value for each test chart gradation value and each nozzle 212 of the inkjet head 200, as the nozzle-specific second density measurement value (one example of a post-dry density measurement value) (step S8, which is one example of a post-dry density measurement value acquisition step). That is, the nozzle-specific second density measurement value is acquired for each nozzle 212 from the read values of respective density patches 12-1, 12-2 . . . 12-N of the image 22. FIG. 6B illustrates one example of the acquisition of nozzle-specific second density measurement value i–1, nozzle-specific second density measurement value i–2 . . . nozzle-specific second density measurement value i-N of nozzle number i among the plurality of nozzles 212 of the inkjet head 200. The density measurement value acquisition unit 122 stores this nozzle-specific second density measurement value in the density measurement value storage unit 124.

Finally, in the operation processing unit 126, based on the first unevenness correction value stored in the unevenness correction value storage unit 130 and the nozzle-specific first density measurement value and nozzle-specific second density measurement value stored in the density measurement value storage unit 124, the image processing unit 106 acquires a nozzle-specific density measurement value conversion value indicating the conversion relationship between the density measurement value before the drying fixation of a print image (here, nozzle-specific first density measurement value) and the density measurement value after the drying fixation (here, nozzle-specific second density measurement value) for each nozzle (each nozzle area) (step 9, which is one example of a density measurement value conversion value calculation step).

Figure 7A:
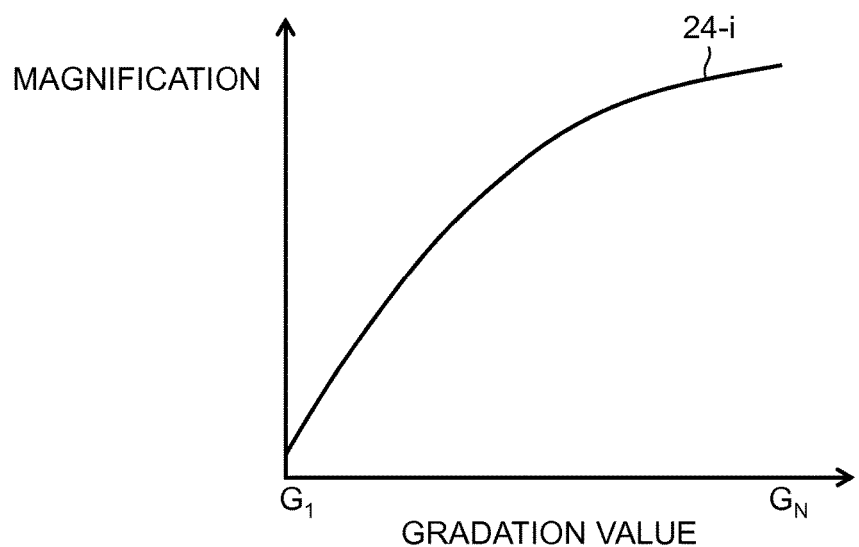
FIGS. 7A and 7B are explanatory diagrams of a density measurement value conversion value.
Figure 7B:
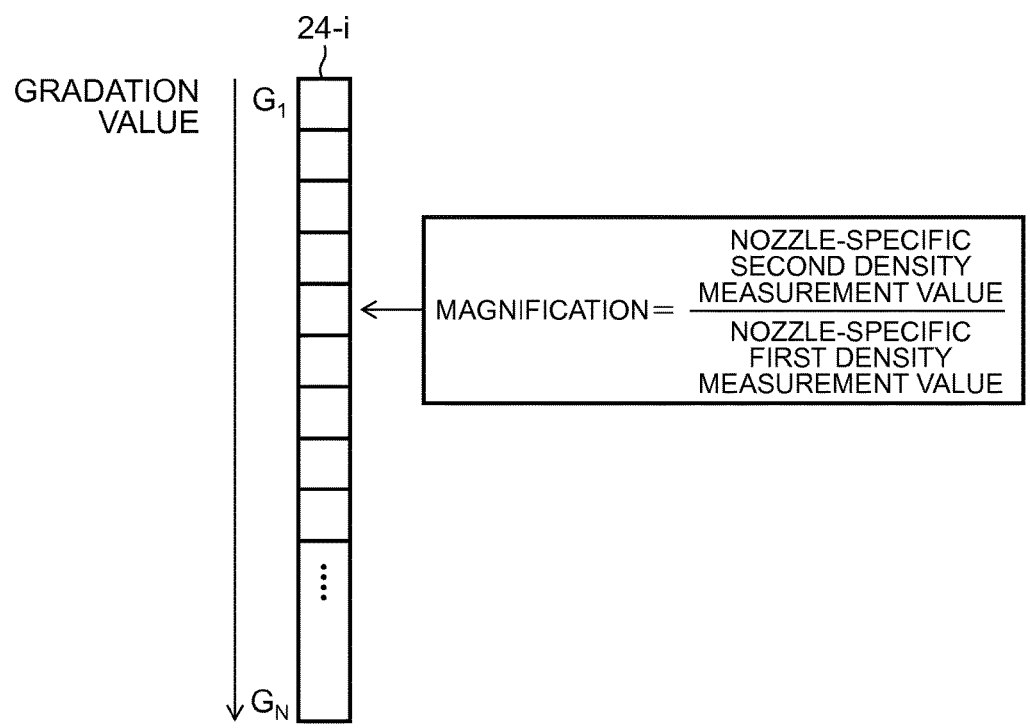

As illustrated in FIGS. 7A and 7B, nozzle-specific density measurement value conversion value 24-$i$ is the magnification of the density measurement value after drying fixation with respect to the density measurement value before drying fixation for each test chart gradation value of the nozzle of nozzle number i. Moreover, when the image data 10 of the test pattern for density measurement is printed, this test chart gradation value is subjected to unevenness correction processing by the first unevenness correction value that is the latest unevenness correction value for each nozzle 212. That is, nozzle-specific density measurement value conversion value 24-$i$ is stored in the density measurement value conversion value storage unit 128 as a function (linear function) in which magnification=(density measurement value after drying fixation)/(density measurement value before drying fixation) is calculated for each test chart gradation value and the first unevenness correction value of each nozzle applied at generation of an image of the test pattern for density measurement is assumed as a parameter, or as a table (one-dimensional table) assuming the first unevenness correction value as an index.

As mentioned above, the calculation processing of the nozzle-specific density measurement value conversion value is ended. Here, the density measurement value conversion value of each nozzle 212 is calculated, but the density measurement value conversion value may be calculated every multiple regions in the X direction. For example, it may be calculated for each region corresponding to the disposition of the ventilation unit, heating unit or pressurization unit or the like of the drying fixation unit 158. Moreover, it may be calculated every multiple nozzles.

[Unevenness Correction Value Calculation Processing]

Figure 8:
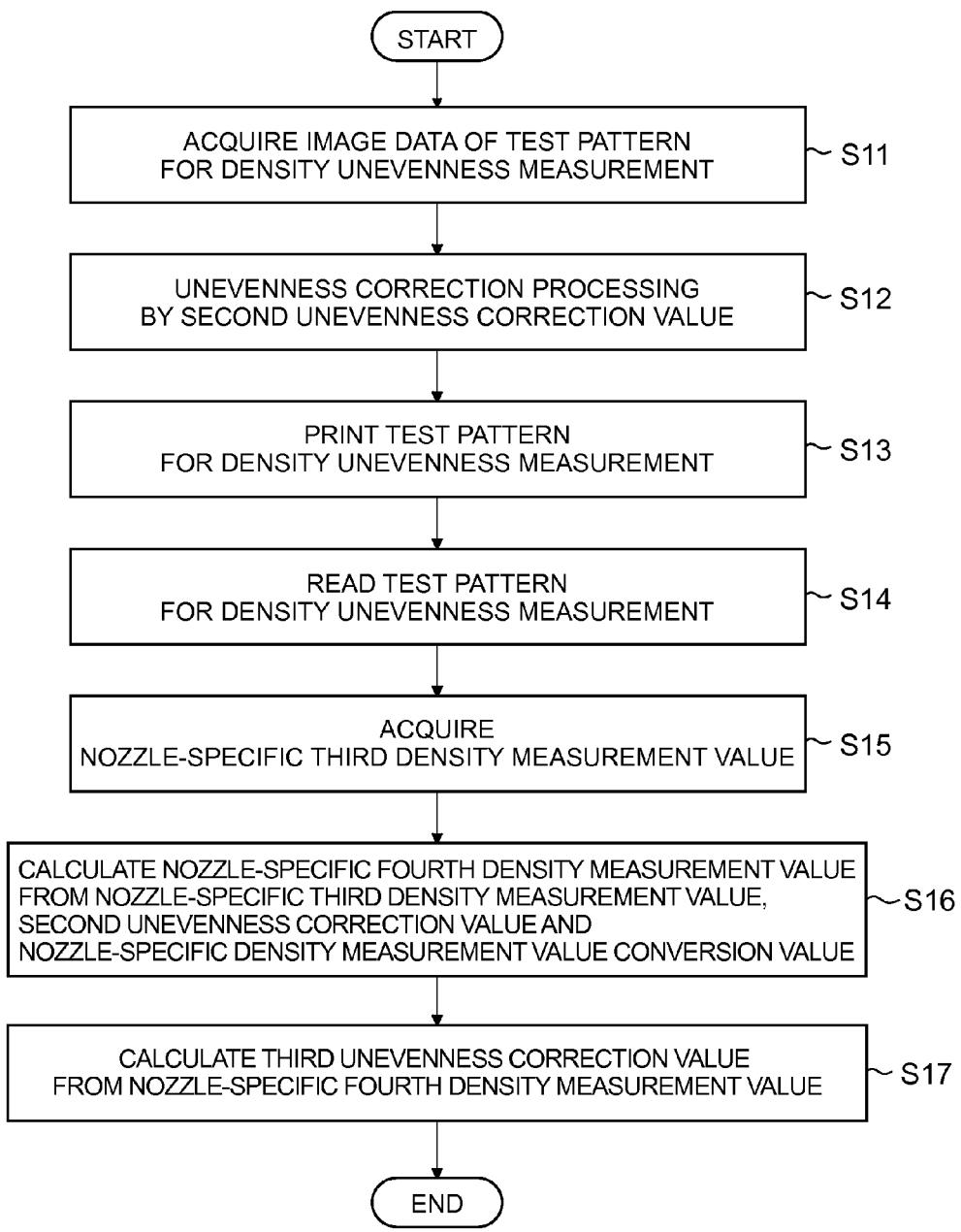
FIG. 8 is a flowchart illustrating processing that calculates an unevenness correction value.

Next, calculation processing (one example of an image processing method) of an unevenness correction value stored by the unevenness correction value storage unit 130 is described using the flowchart in FIG. 8. Here, a case where a nozzle-specific density measurement value conversion value is already calculated and the currently set unevenness correction value is updated to a new unevenness correction value is described. Moreover, the unevenness correction value is calculated for each of four inkjet heads 200 corresponding to respective colors of C, M, Y and K, but the calculation processing of the unevenness correction value of one inkjet head 200 is described here.

In the calculation of the unevenness correction value, first, the image processing unit 106 acquires image data of a test pattern for density unevenness measurement in the image data acquisition unit 104 (step S11). As the image data of the test pattern for density unevenness measurement, the image data 10 (see FIG. 5) of the test pattern for density measurement can be used as well as the calculation processing of the density measurement value conversion value.

Next, the image processing unit 106 reads the second unevenness correction value that is the latest unevenness correction value from the unevenness correction value storage unit 130 in the unevenness correction processing unit 108, and performs unevenness correction processing on the image data of the test pattern for density unevenness measurement on the basis of the read second unevenness correction value (step S12).

Based on the image data of the test pattern for density unevenness measurement on which this unevenness correction processing is performed, the printing unit 152 (one example of a density unevenness measurement image formation device) prints an image of the test pattern for density unevenness measurement (one example of an image for density unevenness measurement) on the recording medium 140 by the inkjet head 200 (step S13, which is one example of a density unevenness measurement image formation step).

Next, the image of the test pattern for density unevenness measurement, which is printed on the recording medium 140, is read by the scanner 156 (step S14). The image of the test pattern for density unevenness measurement, which is read here, is in a state before drying fixation by the drying fixation unit 158.

Based on the read value of the scanner 156, the image processing unit 106 acquires the density measurement value for each test chart gradation value and each nozzle 212 of the inkjet head 200 as the nozzle-specific third density measurement value in the density measurement value acquisition unit 122 (step S15, which is one example of a density measurement value acquisition step). The density measurement value acquisition unit 122 stores this nozzle-specific third density measurement value in the density measurement value storage unit 124.

Subsequently, in the operation processing unit 126, the image processing unit 106 calculates the nozzle-specific fourth density measurement value corresponding to the density measurement value (conversion density measurement value) after the drying fixation of each nozzle 212, on the basis of the second unevenness correction value stored in the unevenness correction value storage unit 130, the nozzle-specific third density measurement value stored in the density measurement value storage unit 124 and the nozzle-specific density measurement value conversion value stored in the density measurement value conversion value storage unit 128 (step S16, which is one example of a density measurement value conversion step).

Figure 9:
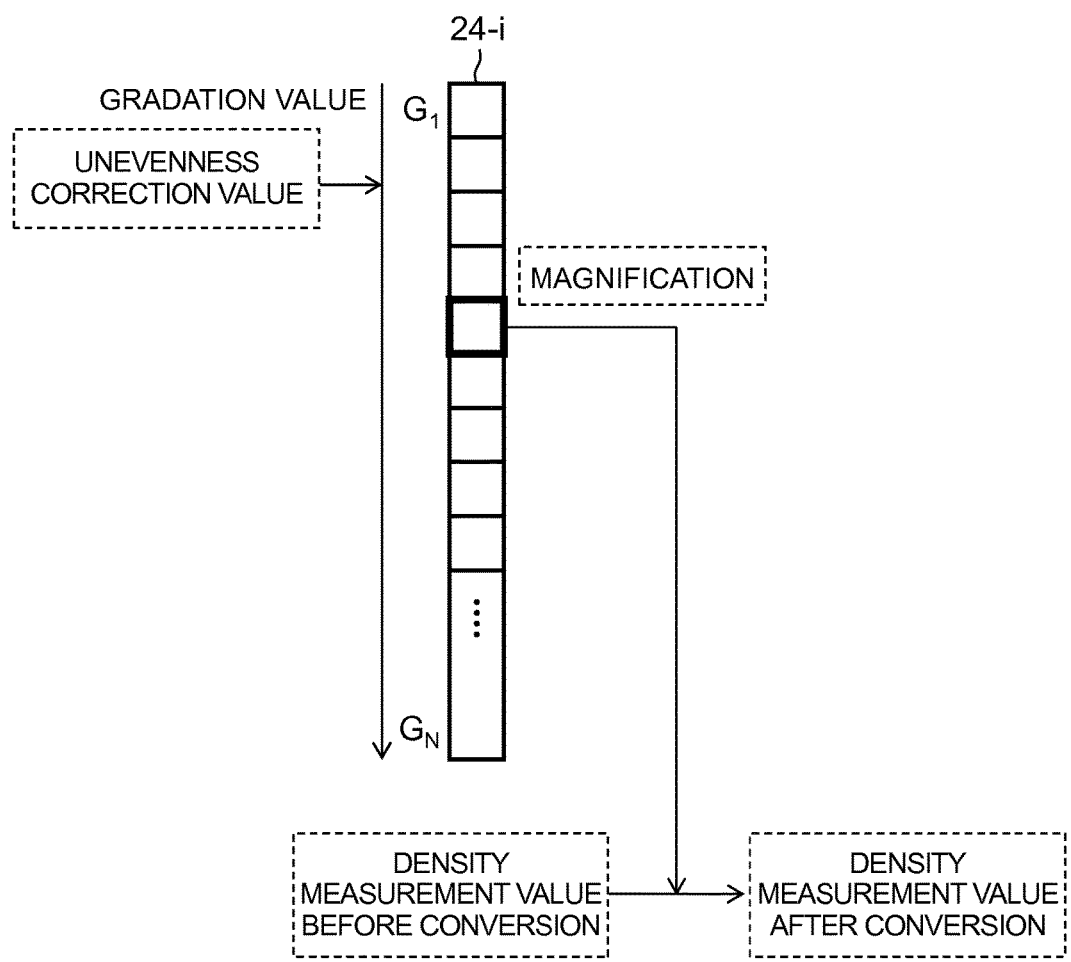
FIG. 9 is an explanatory diagram of operation to which a density measurement value conversion value is applied.

As illustrated in FIG. 9, nozzle-specific density measurement value conversion value 24-$i$ is the magnification of the density measurement value before and after drying fixation with respect to a gradation value. As the gradation value, test chart gradation values $G_1, G_2 \ldots G_N$ of the test pattern for density unevenness measurement at the time of acquisition of the third density measurement value is applied. These test chart gradation values $G_1, G_2 \ldots G_N$ are subjected to unevenness correction processing by the unevenness correction value (here, second unevenness correction value) of each nozzle 212 at the time of printing of the test pattern for density unevenness measurement. That is, the operation processing unit 126 (one example of a density measurement value conversion device) assumes the value of the unevenness correction value applied to the test pattern for density unevenness measurement in each nozzle 212 as an input value, and acquires a density measurement value conversion value corresponding to the input value. The acquired nozzle-specific density measurement value conversion value is multiplied by the third density measurement value to calculate the nozzle-specific fourth density measurement value. Thus, the nozzle-specific fourth density measurement value is calculated for each nozzle 212 and each gradation value.

Finally, in the operation processing unit 126 (one example of an unevenness correction value derivation device), the image processing unit 106 derives the third unevenness correction value on the basis of the nozzle-specific fourth density measurement value (step S17, which is an unevenness correction value derivation step), stores the derived third unevenness correction value in the unevenness correction value storage unit 130 (one example of a storage device) as the latest unevenness correction value and ends the calculation processing of the unevenness correction value.

[Print Processing of Image Data]

Figure 10:
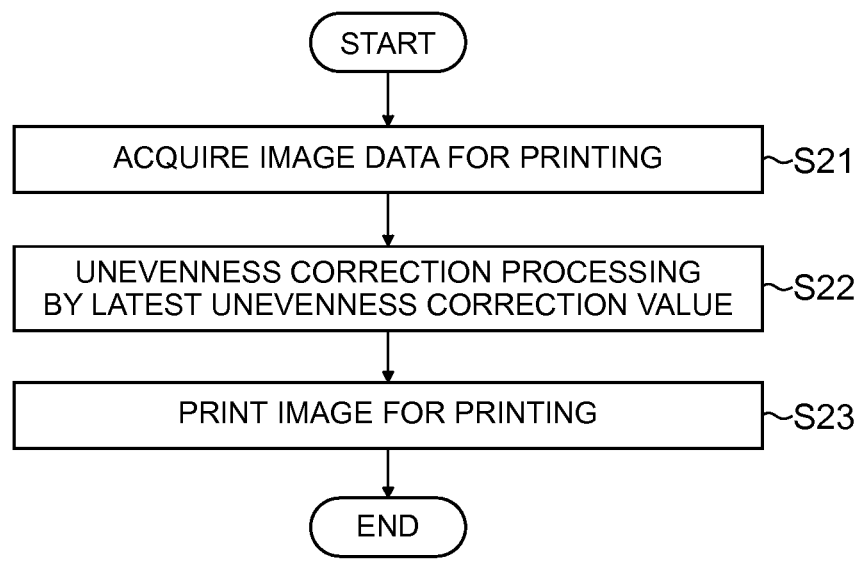
FIG. 10 is a flowchart illustrating print processing.

As mentioned above, when the third unevenness correction value that is a new unevenness correction value is calculated, unevenness correction processing that applies the third unevenness correction value is performed in the unevenness correction processing unit 108. Print processing that performs unevenness correction processing on image data and performs printing is described using the flowchart illustrated in FIG. 10.

In print processing of image data, first, the image processing unit 106 acquires image data for printing in the image data acquisition unit 104 (step S21).

The dot data generation unit 110 performs color conversion processing and color separation (classification) processing on this image data for printing. Afterward, the third unevenness correction value that is the latest unevenness correction value is read for each ink color from the unevenness correction value storage unit 130 in the unevenness correction processing unit 108, and unevenness correction processing is individually performed on the image data of each color by applying the read third unevenness correction value (step S22). In addition, halftone processing is performed on the image data after the unevenness correction processing, and the dot data of each color is generated. This dot data of each color is input in the printing unit 152 of the image recording unit 150.

In the image recording unit 150, the inkjet head 200 of each color is controlled in the printing unit 152 on the basis of the dot data of each color, and a print image based on the dot data is printed on the recording medium 140 (step S23).

The recording medium 140 on which the print image is printed is transported to the drying fixation unit 158 by the transportation unit 154. The drying fixation unit 158 dries and fixes the print image printed on the recording surface of the recording medium 140. Afterward, the recording medium 140 in which the print image is dried and fixed is discharged from the discharge unit 160.

The density measurement value conversion value calculation processing and the unevenness correction value calculation processing, which are described above, can be formed as a program that causes a computer to execute each step, and a recording medium that stores the program can also be formed.

[Relationship Between Unevenness Correction Value and Ink Amount]

An unevenness correction value is equivalent to an ink amount distribution correction value that corrects the distribution of the ink amount in the nozzle array direction. In a case where the discharge amount of a certain nozzle is too small (or too large) in unevenness correction processing, the discharge amount of the nozzle is increased (or decreased) to realize the original discharge amount.

Figure 11A:
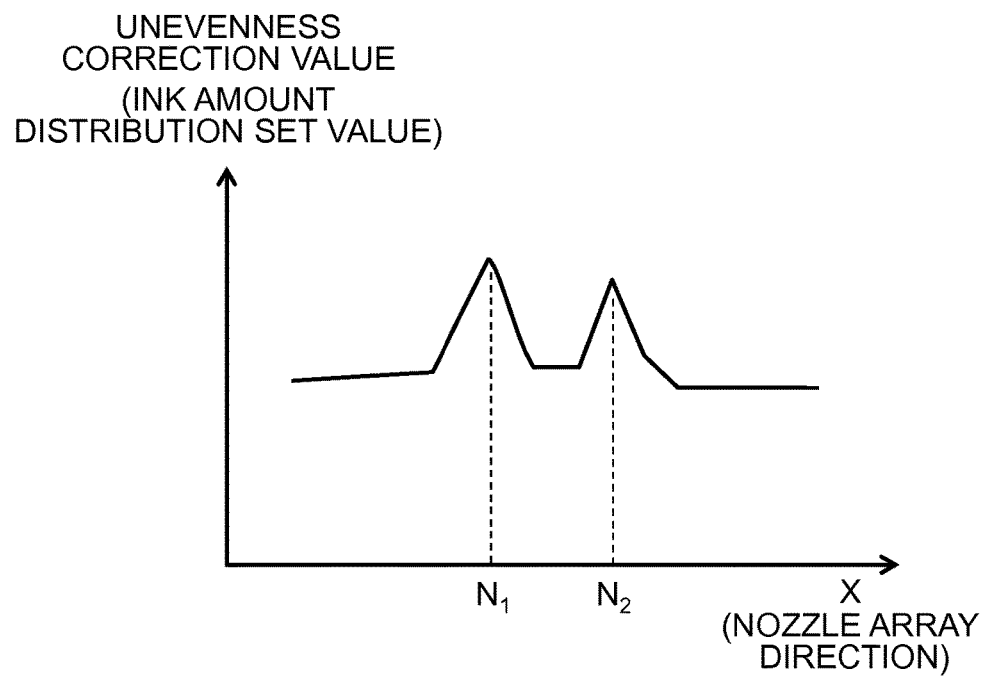
FIGS. 11A and 11B are explanatory diagrams illustrating a relationship between an unevenness correction value and an ink amount.
Figure 11B:
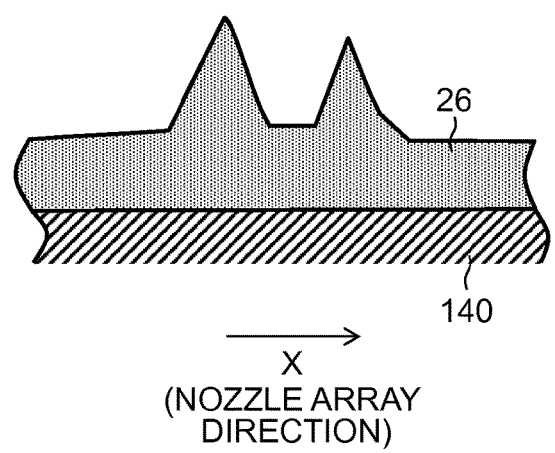

That is, as illustrated in FIG. 11A, the unevenness correction processing is equivalent to processing that increases the unevenness correction value (ink amount set value) of a nozzle ($N_1, N_2$) with a too small discharge amount and increases the ink amount. FIG. 11B illustrates a state where ink 26 is locally increased in positions corresponding to nozzle numbers $N_1$ and $N_2$.

If the discharge state of each nozzle varies and the relationship between the unevenness correction value and the ejection characteristic (storage characteristic) of each nozzle becomes unsuitable, a black stripe may be caused in positions corresponding to the nozzles whose ink amount is increased (positions corresponding to nozzle numbers $N_1$ and $N_2$ of FIG. 11A). Therefore, a test pattern for density measurement subjected to unevenness correction processing that applies an already set unevenness correction value is printed, density unevenness is measured by the use of the read image of the printed test pattern for density measurement, and the unevenness correction value is updated on the basis of the measured density unevenness.

Unevenness correction processing that reflects the discharge state of each nozzle 212 at the time of printing can be realized by arbitrarily updating the unevenness correction value according to the discharge state of the nozzle, and the cause of density unevenness that originates in the ejection characteristic of each nozzle can be controlled.

Figure 12A:
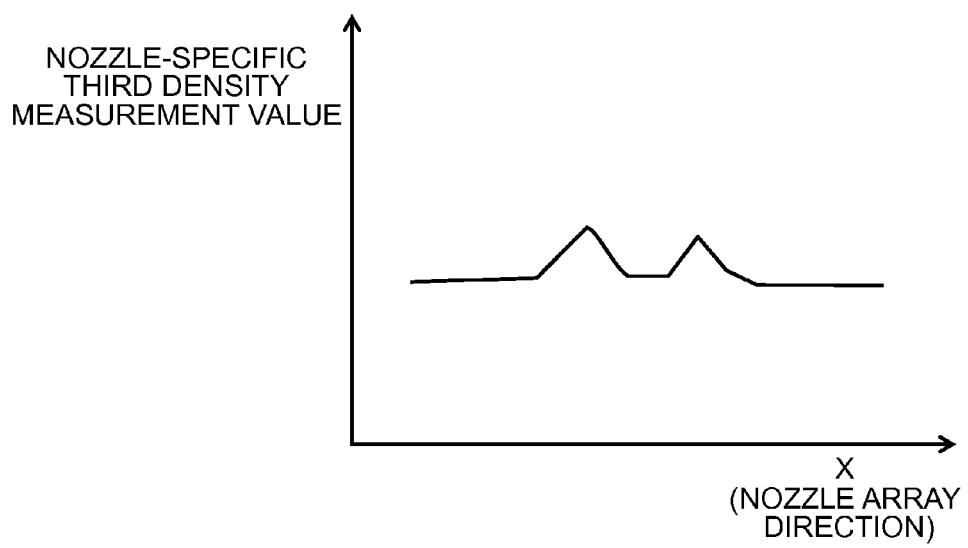
FIGS. 12A and 12B are explanatory diagrams illustrating a density measurement value before and after conversion.
Figure 12B:
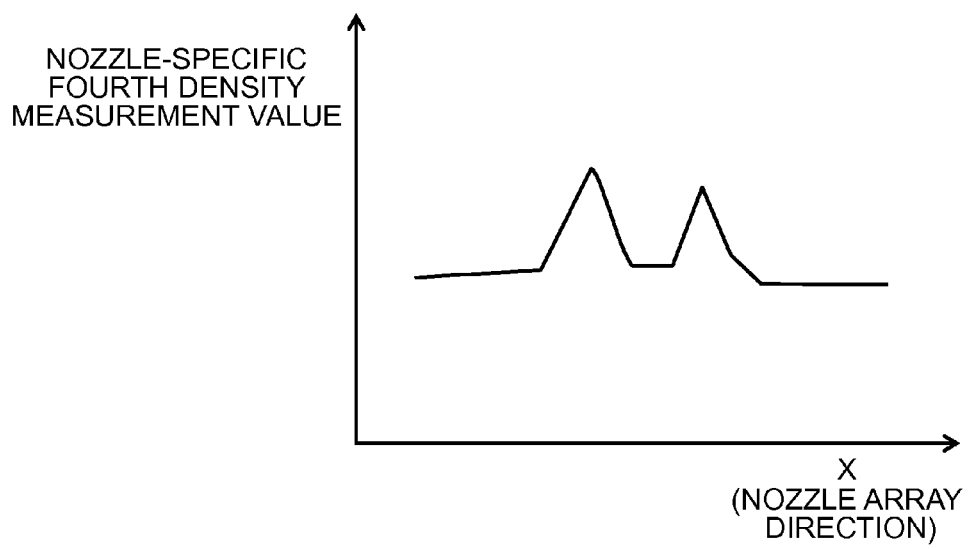

FIG. 12A is a diagram schematically illustrating the nozzle-specific third density measurement value (density measurement value before drying fixation) acquired in step S15 of the flowchart in FIG. 8, and FIG. 12B illustrates the nozzle-specific fourth density measurement value calculated in step S16.

The density measurement value illustrated in FIG. 12A is measured in which a change in an increased (black stripe) part of the ink amount due to an error of the unevenness correction processing and a change with the lapse of time of the ink discharge amount is small, which is influenced by the optical reflection characteristic on the ink surface. Therefore, the real density unevenness is not appropriately reflected to the unevenness correction value calculated using the nozzle-specific third density measurement value.

Meanwhile, as illustrated in FIG. 12B, an increase in the ink amount by the unevenness correction processing is appropriately reflected to the nozzle-specific fourth density measurement value converted into a post-dry density measurement value by the use of the nozzle-specific density measurement value conversion value. That is, even in a configuration that performs density measurement immediately after printing, it is possible to calculate an unevenness correction value that appropriately reflects the real density unevenness by converting a density measurement value before drying fixation, which is the actual density measurement value, into a density measurement value after drying fixation and calculating an unevenness correction value by the use of the density measurement value after drying fixation.

In a case where the dependency to the position of a space region (nozzle position) is not considered, a change in the density measurement value before and after drying fixation has locality in a space due to the influence of dispersion of an ink ejection amount from a nozzle and unevenness in space of drying conditions represented by a drying temperature, and so on. There is a possibility that the locality does not have to be considered in a case where a deposited ink amount is assumed to be uniform by depositing ink in a multiplex manner like printing by multi-pass, but the head ejection ununiformity leads to the ununiformity of the deposited ink amount as it is in single-pass printing, and the locality of a density change before and after drying fixation becomes large as compared with multi-pass. Therefore, it is difficult to absorb the density change before and after drying fixation only by one density measurement conversion value, and it is necessary to prepare a density measurement conversion value of a form taking into account the influence of this locality in order to implement more appropriate correction.

By using the density measurement value conversion value of each nozzle like the present embodiment, it is possible to perform unevenness correction excluding the influence of dispersion of an ink ejection amount from a nozzle and unevenness in space of drying conditions represented by a drying temperature, and so on.

<Second Embodiment>
[Non-Ejection Correction And Density Conversion]

In a case where a defective nozzle (non-ejection nozzle) that cannot eject ink is caused in an inkjet recording apparatus of a single-pass method, an image defect (stripe) is caused in a part corresponding to the nozzle in a printed image. Therefore, non-ejection correction is implemented to prevent the stripe from being caused. Various techniques have been suggested up to now as non-ejection correction, and, for example, there is adopted a method for covering a stripe part by a non-ejection nozzle by enlarging the dot diameter of ink ejected from a nozzle near the non-ejection nozzle.

Figure 13A:
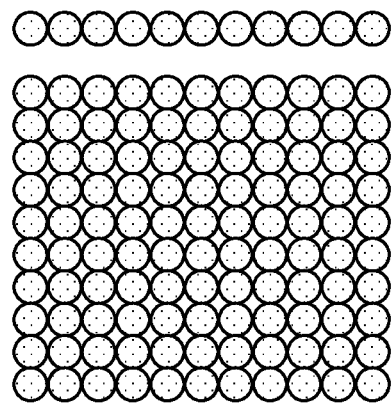
FIGS. 13A-13C are diagrams to describe the density of an image before and after drying fixation in normal dot arrangement.

FIG. 13A is a diagram microscopically illustrating the disposition of dots on a recording medium to which ink is deposited from each nozzle. In FIG. 13A, unevenness correction processing using the density measurement value conversion value of each nozzle is performed, and dots of the same size are uniformly disposed.

Figure 13B:
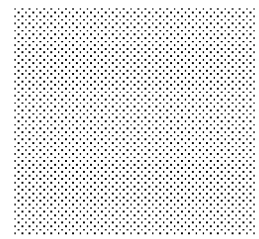
Figure 13C:
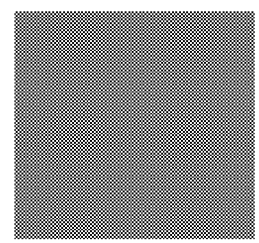

FIGS. 13B and 13C are diagrams macroscopically illustrating the dot disposition illustrated in FIG. 13A, where FIG. 13B illustrates a state before dot drying fixation and FIG. 13C illustrates a state after dot drying fixation. A change in the density is found before and after drying fixation in FIG. 13B and FIG. 13C, but the density in an image is constant in both of them.

Figure 14A:
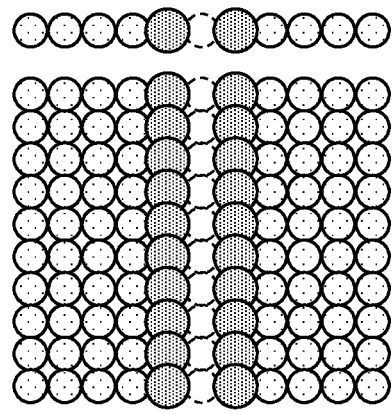
FIGS. 14A-14C are diagrams to describe the density of an image before and after drying fixation in dot arrangement of non-ejection correction.

Meanwhile, FIG. 14A is a diagram microscopically illustrating the disposition of dots on a recording medium to which ink is deposited from each nozzle, and illustrates a state where a non-ejection nozzle exists and therefore non-ejection correction that disposes a dot of a larger size than usual in nozzles of both sides thereof is performed. Even in this case, unevenness correction processing using the density measurement value conversion value of each nozzle is performed.

Figure 14B:
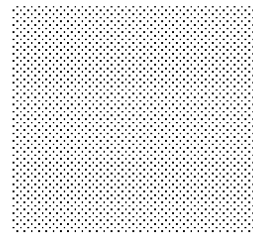
Figure 14C:
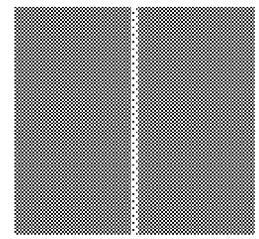

Moreover, FIGS. 14B and 14C are diagrams macroscopically illustrating the dot disposition illustrated in FIG. 14A, where FIG. 14B illustrates a state before dot drying fixation and FIG. 14C illustrates a state after dot drying fixation. As illustrated in FIG. 14B, the density in an image is constant before drying fixation. By contrast with this, as illustrated in FIG. 14C, after drying fixation, a stripe is caused in a part in which non-ejection correction is performed.

Thus, as a result of earnest investigation, the present inventors found that the size of a dot diameter and the disposition of dots in a nozzle near a non-ejection nozzle are different from a normal nozzle and therefore there is a case where appropriate density conversion is not performed when a density measurement value conversion value calculated by a dot for normal printing is applied to a non-ejection correction unit.

[Configurations of Image Recording Apparatus and Inkjet Head]

The configuration of the inkjet recording apparatus 100 according to the second embodiment is similar to the inkjet recording apparatus 100 according to the first embodiment. Moreover, non-ejection correction can be performed in the dot data generation unit 110. The dot data generation unit 110 generates dot data by performing non-ejection correction on the acquired image data 102 according to non-ejection nozzle information acquired beforehand. Moreover, the configuration of the inkjet head 200 according to the second embodiment is similar to the inkjet recording apparatus 100 according to the second embodiment.

[Density Measurement Value Conversion Value Calculation Processing]

Figure 15:
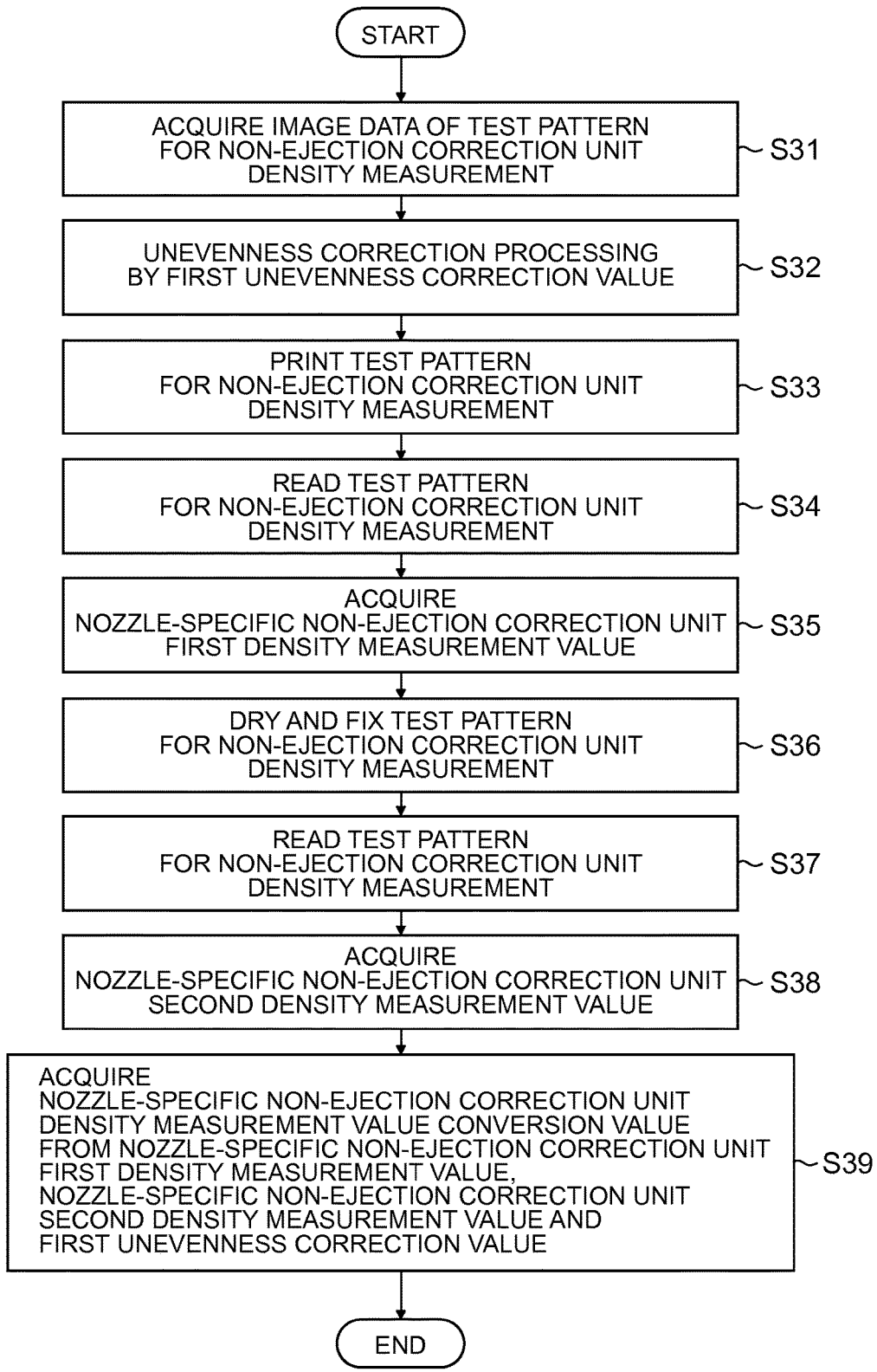
FIG. 15 is a flowchart illustrating processing that calculates a non-ejection correction unit density measurement value conversion value.

Calculation processing of a density measurement value conversion value stored by the density measurement value conversion value storage unit 128 is described using the flowchart in FIG. 15. In the present embodiment, a nozzle-specific anti-non-ejection correction unit density measurement value conversion value (one example of a non-defect correction unit density measurement value conversion value) applied to a normal nozzle and a nozzle-specific non-ejection correction unit density measurement value conversion value (one example of a defect correction unit density measurement value conversion value) applied to a nozzle that performs non-ejection correction are separately calculated and stored. Moreover, regarding calculation processing of the nozzle-specific anti-non-ejection correction unit density measurement value conversion value (one example of a non-defect correction unit density measurement value conversion value calculating step), it only has to be performed as well as the flowchart illustrated in FIG. 4. Therefore, calculation processing of the nozzle-specific non-ejection correction unit density measurement value conversion value is described here.

Here, even regarding the nozzle-specific non-ejection correction unit density measurement value conversion value is calculated for each nozzle 212 and each of four inkjet heads 200 corresponding to respective colors of C, M, Y and K, but calculation processing of the nozzle-specific non-ejection correction unit density measurement value conversion value of one inkjet head 200 is described here.

As for the calculation of the nozzle-specific non-ejection correction unit density measurement value conversion value, first, the image processing unit 106 acquires image data of a test pattern for non-ejection correction unit density measurement in the image data acquisition unit 104 (step S31).

Figure 16:
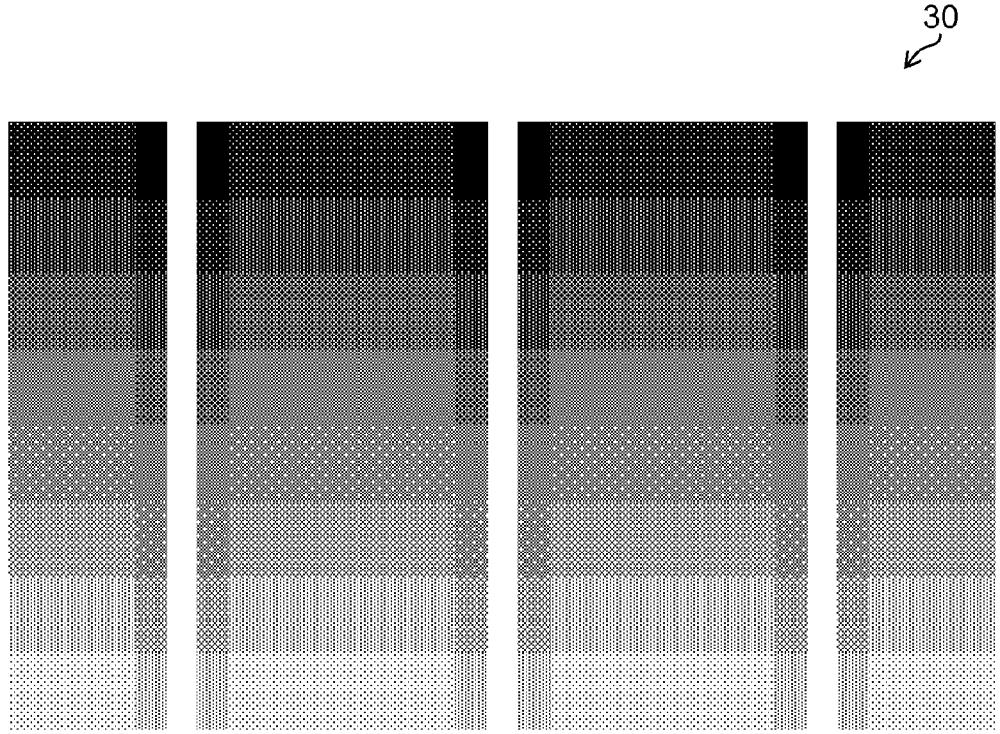
FIG. 16 is a diagram illustrating image data of a test pattern for non-ejection correction unit density measurement.

As for image data 30 of the test pattern for non-ejection correction unit density measurement, as illustrated in FIG. 16, a test chart gradation value (set gradation value) in the X direction is constant as well as the image data 10 of the test pattern for density measurement of the first embodiment, a line in which ink is not disposed is set at n line intervals (n is an integer equal to or greater than 1) in the X direction in density patches of N stages having a predetermined width in the Y direction, and a line of the gradation value of a non-ejection correction unit is disposed in both sides of the line to which ink is not deposited. That is, the image data 30 is printed by a normal nozzle that prints a density patch of constant density, an imitation non-ejection nozzle (one example of an imitation defective nozzle) that is set in a non-ejection state of n intervals and does not eject ink, and an imitation correction nozzle that performs printing at higher density (one example of density for defect correction) than 2×n normal nozzles in both sides thereof. As the gradation value of this imitation correction nozzle (nozzle of non-ejection correction unit), gradation for non-ejection correction used in non-ejection correction and ejection conditions such as ink discharge magnification are used. To improve the calculation accuracy of the nozzle-specific non-ejection correction unit density measurement value conversion value, it is preferable that the gradation value of the non-ejection correction unit is in a state where it is roughly uniform to the density of surrounding anti-non-ejection correction units when a near-field region is macroscopically seen, that is, in a state where non-ejection correction is normally performed.

Here, it is assumed that each density patch is disposed in the gradation value order from the density patch of test chart gradation value $G_1$ with the highest gradation value to the density patch of test chart gradation value $G_N$ with the lowest gradation value.

Next, the image processing unit 106 reads the first unevenness correction value that is the latest unevenness correction value from the unevenness correction value storage unit 130 in the unevenness correction processing unit 108, and performs unevenness correction processing on the image data 30 of the test pattern for non-ejection correction unit density measurement on the basis of the read first unevenness correction value (step S32). The first unevenness correction value is a correction value used for operation to correct the unevenness of each nozzle 212 of a print image, and is stored in the unevenness correction value storage unit 130 for each nozzle 212 of the inkjet head 200 each color and for each set gradation value.

An image of the test pattern for non-ejection correction unit density measurement is printed on the recording medium 140 by the inkjet head 200 of the printing unit 152 on the basis of the image data 30 of the test pattern for non-ejection correction unit density measurement subjected to this unevenness correction processing (step S33).

Next, the image of the test pattern for non-ejection correction unit density measurement, which is printed on the recording medium 140 by the scanner 156, is read (step S34). The image of the test pattern for non-ejection correction unit density measurement, which is read here, is in a state before drying fixation by the drying fixation unit 158.

Based on the read value of the scanner 156 in step S34, the image processing unit 106 acquires the density measurement value for each test chart gradation value and each nozzle 212 of the non-ejection correction unit of the inkjet head 200 as the non-ejection correction unit first density measurement value in the density measurement value acquisition unit 122 (step S35), and stores it in the density measurement value storage unit 124.

Next, the image of the test pattern for non-ejection correction unit density measurement, which is printed on the recording medium 140, is dried and fixed by the drying fixation unit 158 (step S36), and this image of the test pattern for non-ejection correction unit density measurement is read by the scanner 156 (step S37).

The image processing unit 106 reverses the read value of the scanner 156 in step S37 in the density measurement value acquisition unit 122, acquires the density measurement value for each test chart gradation value and each nozzle 212 of the non-ejection correction unit of the inkjet head 200, as the non-ejection correction unit second density measurement value (step S38), and stores it in the density measurement value storage unit 124.

Finally, in the operation processing unit 126, based on the first unevenness correction value stored in the unevenness correction value storage unit 130 and the non-ejection correction unit first density measurement value and non-ejection correction unit second density measurement value stored in the density measurement value storage unit 124, the image processing unit 106 acquires a nozzle-specific non-ejection correction unit density measurement value conversion value indicating the conversion relationship between the density measurement value before the drying fixation of a print image (here, non-ejection correction unit first density measurement value) and the density measurement value after the drying fixation (here, non-ejection correction unit second density measurement value) for each nozzle 212 of the non-ejection correction unit (step 39, which is one example of a defect correction unit density measurement value conversion value calculation step). Details of the calculation are similar to the first embodiment.

In the present embodiment, it is possible to acquire nozzle-specific non-ejection correction unit density measurement value conversion values of 2×n non-ejection correction units for one test pattern for non-ejection correction unit density measurement. Therefore, nozzle-specific non-ejection correction unit density measurement value conversion values of all nozzles 212 of the inkjet head 200 are acquired by similarly processing (total nozzle number of inkjet head 200)/(2×n) test patterns for non-ejection correction unit density measurement while shifting the nozzle positions of the non-ejection correction units until all nozzles correspond to the non-ejection correction units.

Here, the image data 30 of the test pattern for non-ejection correction unit density measurement is not limited to a mode in which a stripe line is set at n line intervals, and any mode is possible as long as the nozzle-specific non-ejection correction unit density measurement value conversion value can be acquired for all nozzles.

[Unevenness Correction Value Calculation Processing]

Figure 17:
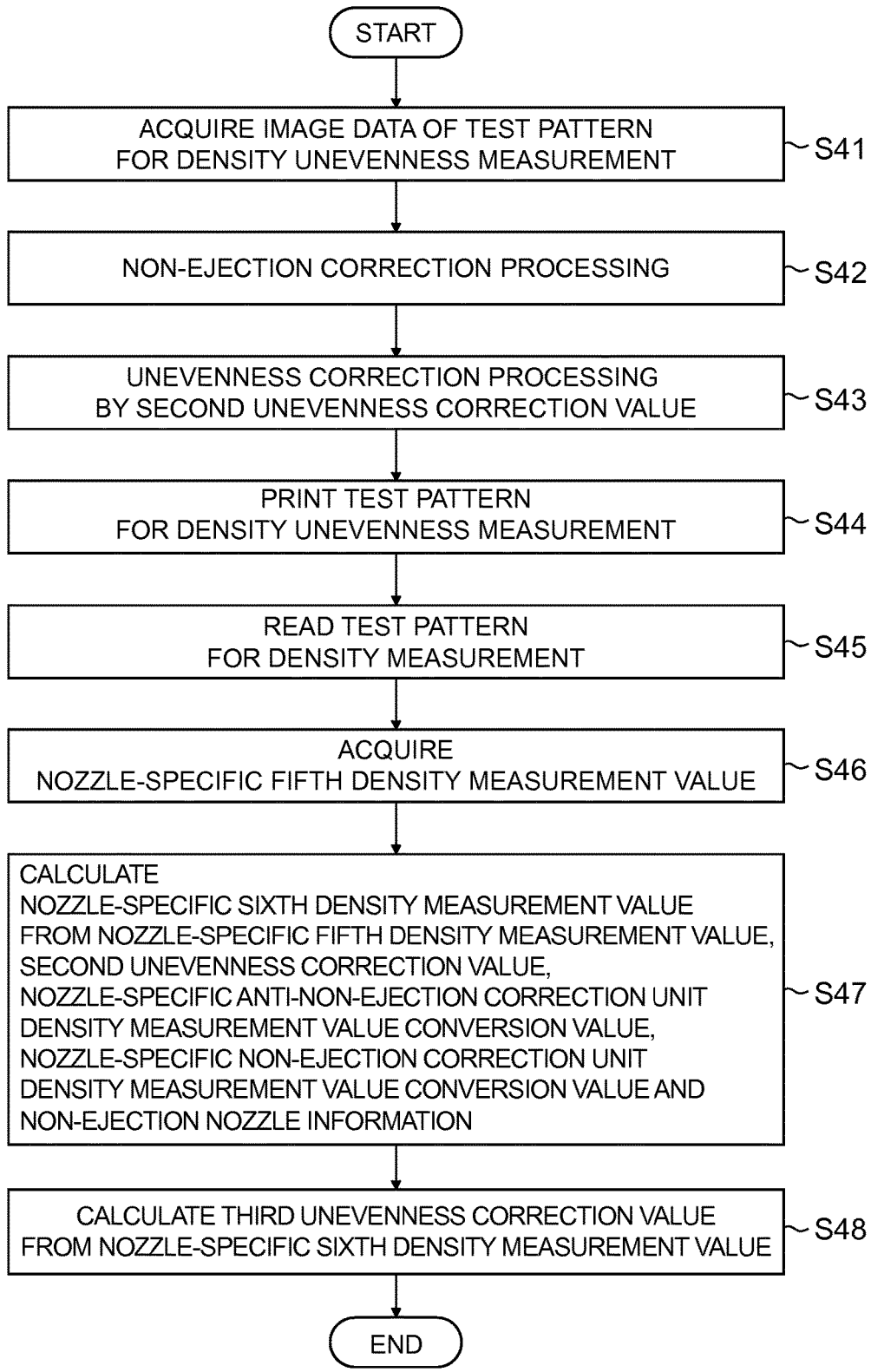
FIG. 17 is a flowchart illustrating processing that calculates an unevenness correction value.

Next, calculation processing of an unevenness correction value in a case where a nozzle-specific anti-non-ejection correction unit density measurement value conversion value and a nozzle-specific non-ejection correction unit density measurement value conversion value are separately included is described using the flowchart in FIG. 17. Here, a case where the nozzle-specific anti-non-ejection correction unit density measurement value conversion value and the nozzle-specific non-ejection correction unit density measurement value conversion value are already calculated and the currently set unevenness correction value is updated to a new unevenness correction value is described. Here, the unevenness correction value is calculated for each of four inkjet heads 200 corresponding to respective colors of C, M, Y and K, but calculation processing of the unevenness correction value of one inkjet head 200 is described here.

As for the calculation of the unevenness correction value, first, the image processing unit 106 acquires image data of the test pattern for density unevenness measurement in the image data acquisition unit 104 (step S41). As the image data of the test pattern for density unevenness measurement, it is possible to use the image data 10 of the test pattern for density measurement (see FIG. 5) as well as the first embodiment.

Next, the image processing unit 106 performs non-ejection correction processing on the image data of the test pattern for density unevenness measurement in the dot data generation unit 110 (one example of a defective nozzle correction device) on the basis of pre-acquired non-ejection nozzle information on the inkjet head 200 (step S42). In addition, the image processing unit 106 reads the second unevenness correction value that is the latest unevenness correction value from the unevenness correction value storage unit 130 in the unevenness correction processing unit 108 and performs unevenness correction processing on the image data of the test pattern for density unevenness measurement on the basis of the read second unevenness correction value (step S43).

Based on the image data of the test pattern for density unevenness measurement on which these non-ejection correction processing and unevenness correction processing are performed, an image of the test pattern for density unevenness measurement is printed on the recording medium 140 by the inkjet head 200 of the printing unit 152 (step S44).

Next, the image of the test pattern for density unevenness measurement, which is printed on the recording medium 140, is read by the scanner 156 (step S45). The read image of the test pattern for density unevenness measurement here is in a state before drying fixation by the drying fixation unit 158.

Based on the read value of the scanner 156, the image processing unit 106 acquires the density measurement value for each test chart gradation value and each nozzle 212 of the inkjet head 200 as the nozzle-specific fifth density measurement value in the density measurement value acquisition unit 122 (step S46). The density measurement value acquisition unit 122 stores this nozzle-specific fifth density measurement value in the density measurement value storage unit 124.

Subsequently, in the operation processing unit 126, the image processing unit 106 calculates the nozzle-specific sixth density measurement value corresponding to the density measurement value after drying fixation of each nozzle 212, on the basis of the second unevenness correction value stored in the unevenness correction value storage unit 130, the nozzle-specific fifth density measurement value stored in the density measurement value storage unit 124, the pre-acquired non-ejection nozzle information and the nozzle-specific anti-non-ejection correction unit density measurement value conversion value and nozzle-specific non-ejection correction unit density measurement value conversion value stored in the density measurement value conversion value storage unit 128 (step S47).

Figure 18:
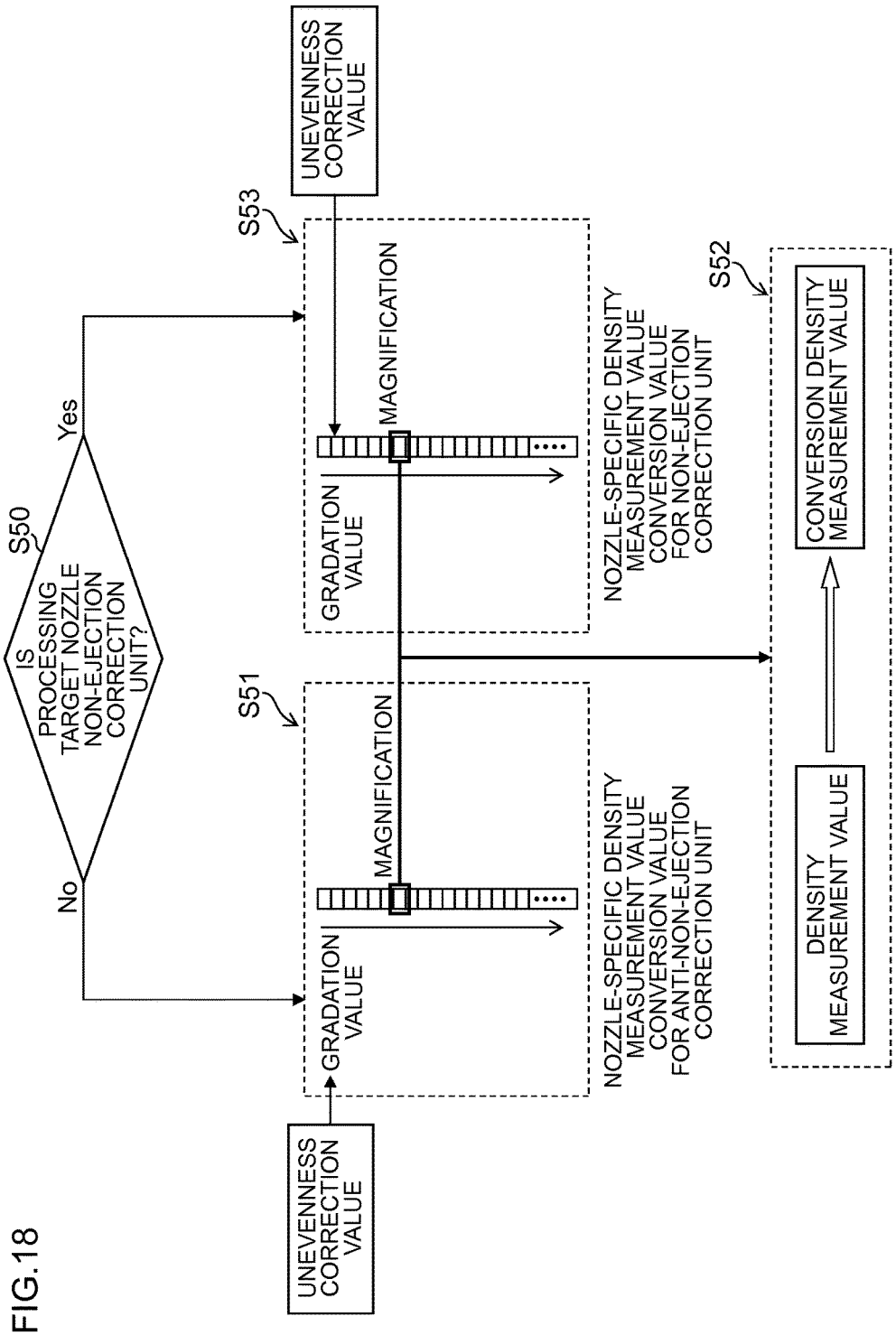
FIG. 18 is a flowchart illustrating processing of density conversion according to a nozzle.

Here, as illustrated in FIG. 18, it is determined whether each nozzle 212 is a non-ejection correction unit (step S50).

In a case where the nozzle 212 is not the non-ejection correction unit, that is, in a case where an adjacent nozzle is not a non-ejection nozzle or it is a non-ejection nozzle, a nozzle-specific anti-non-ejection correction unit density measurement value conversion value assuming the second unevenness correction value of the nozzle 212 as an input value is read from the density measurement value conversion value storage unit 128 (step S51), and the nozzle-specific sixth density measurement value is calculated by multiplying the nozzle-specific anti-non-ejection correction unit density measurement value conversion value by the nozzle-specific fifth density measurement value (step S52).

By contrast, in a case where the nozzle 212 is the nozzle of the non-ejection correction unit, that is, in a case where the adjacent nozzle is the non-ejection nozzle, a nozzle-specific non-ejection correction unit density measurement value conversion value assuming the second unevenness correction value of the nozzle 212 as an input value is read from the density measurement value conversion value storage unit 128 (step S53), and the nozzle-specific sixth density measurement value is calculated by multiplying the nozzle-specific non-ejection correction unit density measurement value conversion value by the nozzle-specific fifth density measurement value (step S52). This processing is performed for all nozzles.

Returning to the explanation of FIG. 17, the image processing unit 106 calculates the third unevenness correction value on the basis of the nozzle-specific sixth density measurement value in the operation processing unit 126 (step S48), stores the calculated third unevenness correction value in the unevenness correction value storage unit 130 as the latest unevenness correction value and ends the calculation processing of the unevenness correction value.

As mentioned above, it is possible to perform appropriate density conversion even in the non-ejection correction unit by separately calculating and storing the nozzle-specific anti-non-ejection correction unit density measurement value conversion value and the nozzle-specific non-ejection correction unit density measurement value conversion value.

[Print Processing of Image Data]

Figure 19:
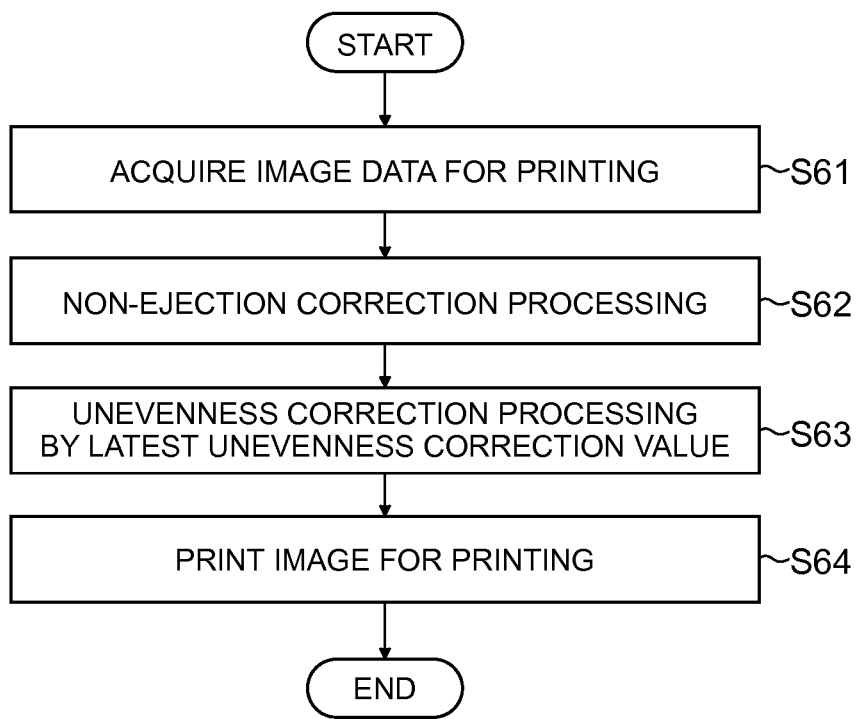
FIG. 19 is a flowchart illustrating print processing.

As mentioned above, when the third unevenness correction value that is a new unevenness correction value is calculated, unevenness correction processing that applies the third unevenness correction value is performed in the unevenness correction processing unit 108. Print processing that performs unevenness correction processing on image data and performs printing is described using the flowchart illustrated in FIG. 19.

In the print processing of the image data, first, the image processing unit 106 acquires image data for printing in the image data acquisition unit 104 (step S61).

The dot data generation unit 110 performs color conversion processing, color separation (classification) processing and non-ejection correction processing on this image data for printing (step S62). Afterward, the third unevenness correction value that is the latest unevenness correction value is read for each ink color from the unevenness correction value storage unit 130 in the unevenness correction processing unit 108, and unevenness correction processing is performed on the image data of each color by applying the read third unevenness correction value (step S63). In addition, halftone processing is performed on the image data after unevenness correction processing, and dot data of each color is generated. This dot data of each color is input in the printing unit 152 of the image recording unit 150.

In the image recording unit 150, the inkjet head 200 of each color is controlled in the printing unit 152 on the basis of the dot data of each color, and a print image based on the dot data is printed on the recording medium 140 (step S64).

The recording medium 140 on which the print image is printed is transported to the drying fixation unit 158 by the transportation unit 154. The drying fixation unit 158 dries and fixes the print image printed on the recording surface of the recording medium 140. Afterward, the recording medium 140 on which the print image is dried and fixed is discharged from the discharge unit 160.

As mentioned above, by performing unevenness correction by the unevenness correction value calculated using the nozzle-specific anti-non-ejection correction unit density measurement value conversion value and the nozzle-specific non-ejection correction unit density measurement value conversion value, it is possible to print an appropriate image without density unevenness even in a case where a non-ejection nozzle exists.

<Third Embodiment>
[Light Quantity Difference Model]

The nozzle-specific density measurement value conversion value of the first embodiment and the nozzle-specific anti-non-ejection correction unit density measurement value conversion value and nozzle-specific non-ejection correction unit density measurement value conversion value of the second embodiment are expressed by magnification=(density measurement value after drying fixation)/(density measurement value before drying fixation). However, if a strict model is considered, the relationship between a measurement density measurement value and a conversion density measurement value is not equivalent to simple magnification calculation.

When an unevenness correction value is assumed as V, a density measurement value before drying processing with respect to V is assumed as I_before and a density measurement value after drying processing is assumed as I_after, the relationship of both can be expressed as follows, using generally expressed transform function f (x0, x1).

$$I\_after = f(I\_before, V)$$

Here, the form of transform function f (x0, x1) is arbitrary, such as a linear function, a non-linear function and a lookup table.

It can be said that the reflection of light is a phenomenon of energy balance=addition and subtraction. When an optical density given from an illumination system is assumed as I_all, a light quantity loss amount with respect to pre-drying-processing density measurement value I_before is assumed as I_before_loss and a light quantity loss amount with respect to post-drying-processing density measurement value I_after is assumed as I_after_loss, since I_all=I_before+I_before_loss=I_after+I_after_loss is established, it is possible to express I_after=I_before+(I_before_loss−I_after_loss)=I_before+dI (Expression 1). Therefore, when the value of this dI=I_before_loss−I_after_loss is found, it is possible to estimate I_after from I_before.

Here, when the optical reflectivity before drying in a space is assumed as r_before and the optical reflectivity after drying is assumed as r_after, since I_before=I_all×r_before, I_after=I_all×r_after, I_before loss=I_all×(1−r_before) and I_after_loss=I_all×(1−r_after) are established, it is possible to express I_after=I_before×(r_before/r_after)=I_before×R (Expression 2). Therefore, if the value of this R=r_before/r_after is found, it is possible to estimate I_after from I_before.

Figure 20A:
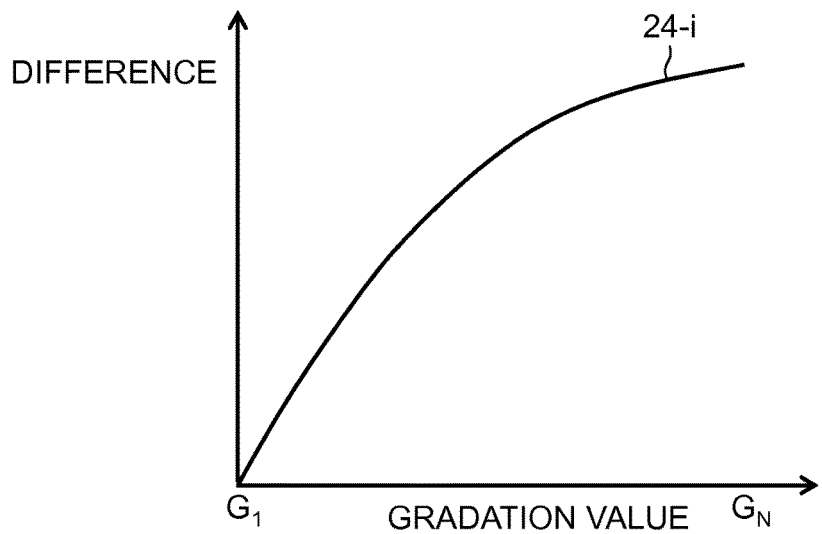
FIGS. 20A and 20B are explanatory diagrams of a density measurement value conversion value.
Figure 20B:
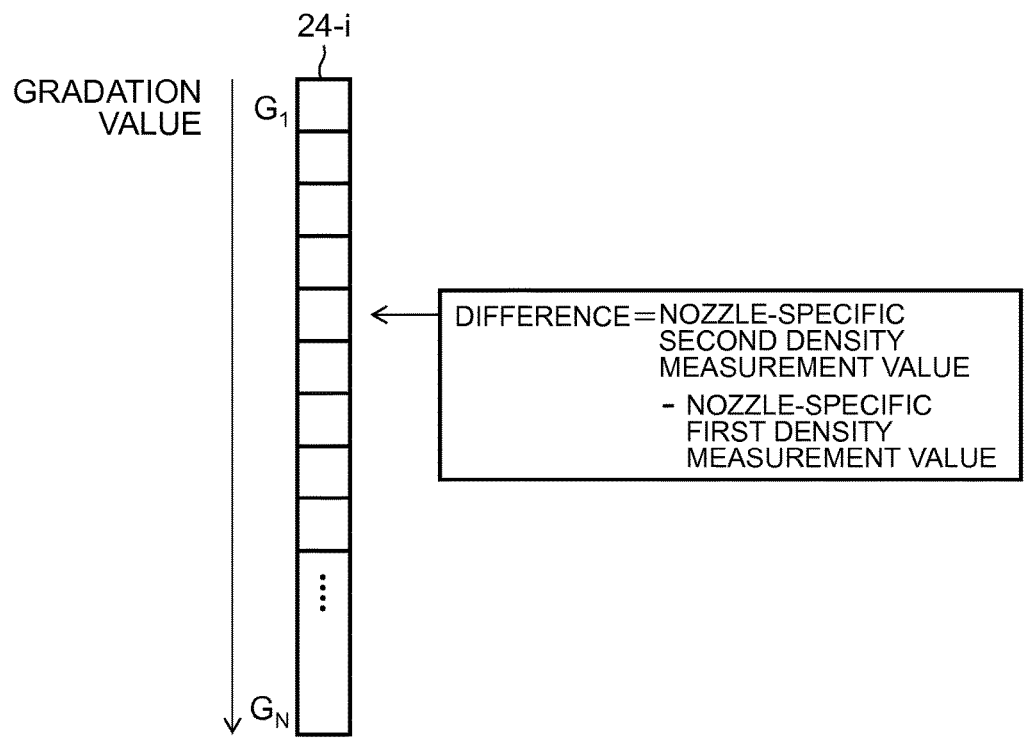
Figure 21:
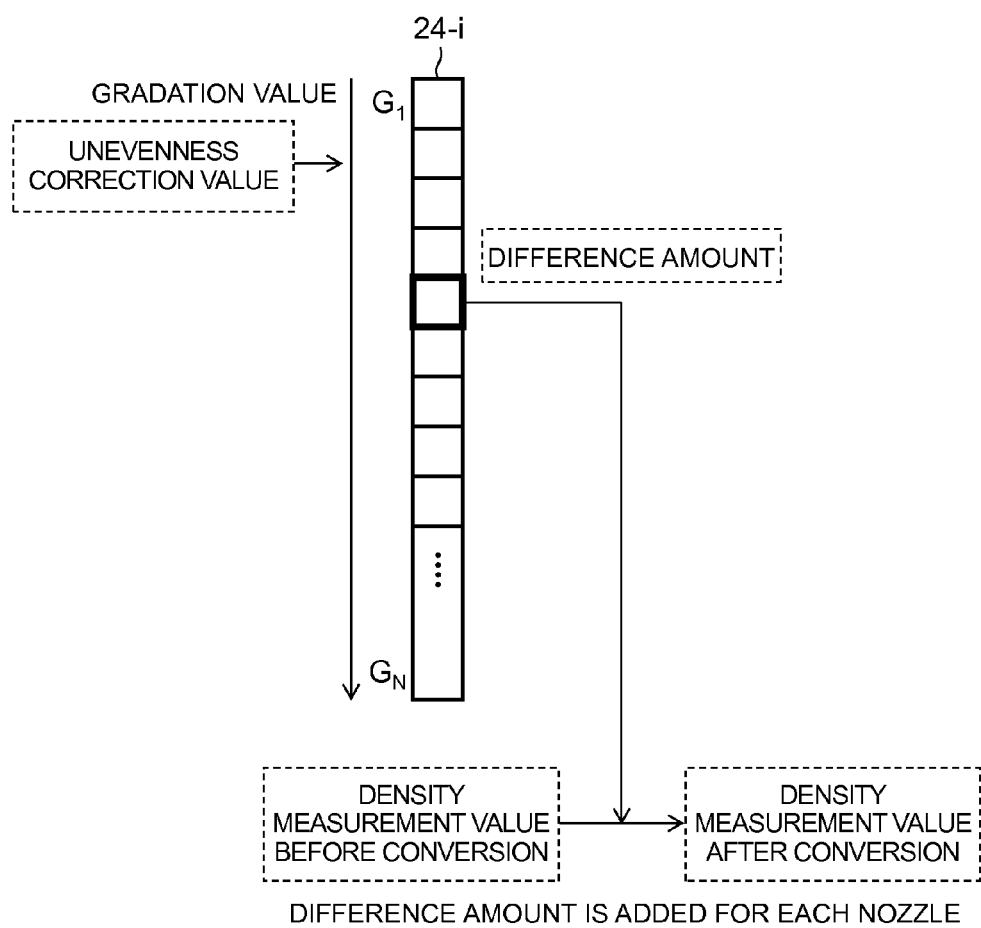
FIG. 21 is an explanatory diagram of operation to which a density measurement value conversion value is applied.

Here, both Expression 1 and Expression 2 are expressions derived on the basis of the same phenomenon. In the first embodiment and the second embodiment, the value of R is measured as a density measurement value conversion value on the basis of Expression 2. Meanwhile, it is also possible to assume dI as a density measurement value conversion value. In this case, it only has to perform processing that calculates the density measurement value conversion value as a difference between the nozzle-specific first density measurement value (density measurement value before drying fixation) and the nozzle-specific second density measurement value (density measurement value after drying fixation) as illustrated in FIGS. 20A and 20B and adds the density measurement value conversion value to the density measurement value before drying fixation in density measurement value conversion processing (one example of a density measurement value conversion step) as illustrated in FIG. 21.

Here, even in a case where any of the difference model shown in Expression 1 and the ratio model shown in Expression 2 is used, the same result is obtained on the principle. However, the difference model is actually more practicable. That is, in a case where density is measured, measurement error 6 is included in the measurement result as follows.

$$I\_before = I\_before(\text{correct value}) + \delta$$

When this is assigned to Expression 2, an error included in I_after becomes R×δ. Meanwhile, in a case where it is assigned to Expression 1, an error included in I_after is δ as it is.

In a case where a general imaging element such as a CCD (Charge Coupled Device) and a CMOS (Complementary Metal Oxide Semiconductor) is used, measurement error δ becomes larger as it is a darker color with high density. The value of R depends on ink, and so on, but, in many cases, R>1 is established in a region of high density to which much ink is deposited. That is, in a case where Expression 2 is used, noise is amplified. Therefore, it is possible to perform correction processing stability when a stable difference model is used for a measurement error.

<Fourth Embodiment>
[Application Example to Other Apparatus Configurations]

Figure 22:
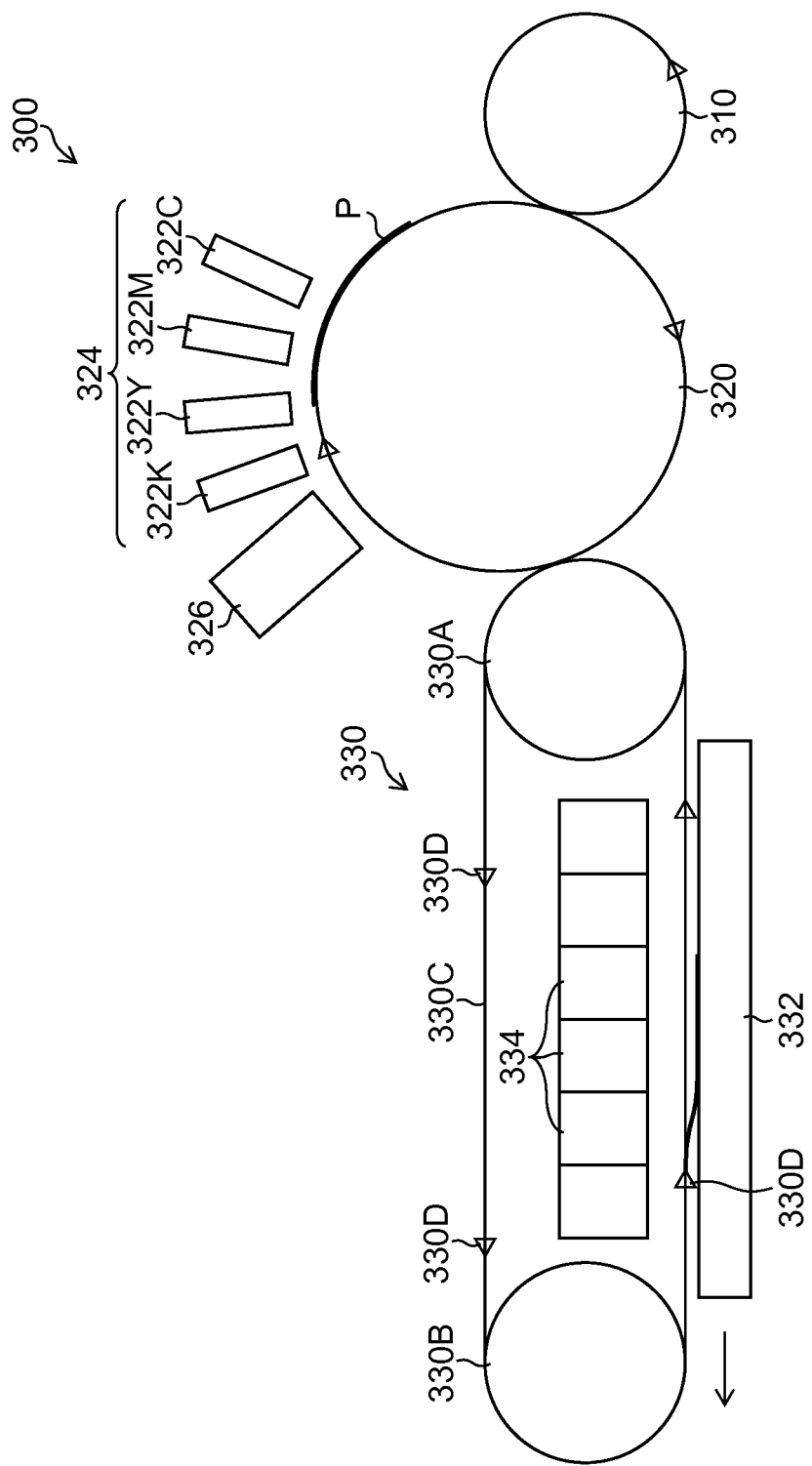
FIG. 22 is an entire configuration diagram of an inkjet recording apparatus.

Next, other apparatus configurations to which the above-mentioned image processing method, image processing apparatus and inkjet recording apparatus are applied are described using FIG. 22.

An inkjet recording apparatus 300 includes transportation drums 310 and 320, an inkjet head unit 324, a scanner 326, a chain gripper 330, a guideboard 332 and a heating unit 334.

The transportation drums 310 and 320 are formed in a cylindrical shape and driven by a motor (not illustrated) to rotate centering on the cylinder center. The transportation drum 310 transports paper P that is a recording medium fed from a feeding unit (not illustrated) while holding it on the peripheral surface, and passes it to the transportation drum 320. The transportation drum 320 passes paper P, which is passed from the transportation drum 310, to the chain gripper 330. The chain gripper 330 transports paper P, which is passed from the transportation drum 320, to a paper discharge unit (not illustrated).

The inkjet head unit 324 has inkjet heads 322C, 322M, 322Y and 322K. The inkjet head 200 illustrating in FIG. 2 can be applied as the inkjet heads 322C, 322M, 322Y and 322K. The inkjet heads 322C, 322M, 322Y and 322K are disposed so as to be substantially orthogonal to the transportation direction of paper P by the transportation drum 320, and are disposed such that the nozzle surface thereof faces the peripheral surface of the transportation drum 320. Moreover, the inkjet heads 322C, 322M, 322Y and 322K record an image on the recording surface of paper P transported by the transportation drum 320, by ejecting ink drops of respective colors of C, M, Y and K from nozzles (not illustrated) formed on the nozzle surface to paper P transported (one example of relative movement) to the transportation drum 320 (one example of a movement device) on the basis of a control signal input from a control unit (not illustrated) to which the image processing unit 106 illustrated in FIG. 1 is applied.

The scanner 326 is a sensor to read the image recorded on paper P, and it is possible to apply the scanner 156 illustrated in FIG. 1.

Afterward, the transportation drum 320 passes paper P to the chain gripper 330.

The chain gripper 330 is a transportation device that transports paper P received from the transportation drum 320 to a paper discharge unit (not illustrated) and includes the first sprocket 330A, the second sprocket 330B, a chain 330C and a gripper 330D.

The first sprocket 330A is installed on the side of the transportation drum 320, and the second sprocket 330B is installed on the side of the paper discharge unit (not illustrated). The first sprocket 330A and the second sprocket 330B are supported by a bearing (not illustrated) and rotatably set, and a motor (not illustrated) is coupled with the first sprocket 330A.

The chain 330C is formed in an endless shape and is wound around the first sprocket 330A and the second sprocket 330B. The first sprocket 330A, the second sprocket 330B and the chain 330C are formed in pairs respectively and are disposed on both sides of the transportation path of paper P (both sides of paper P in a direction orthogonal to the transportation direction).

The gripper 330D is installed while being bridged to the pair of installed chains 330C, and a plurality of grippers 330D are attached to the chains 330C at regular intervals. The gripper 330D is configured so as to hold the front edge of paper P in a position in which paper P is passed from the transportation drum 320, and release the holding of paper P in a position in which the paper is passed to the paper discharge unit (not illustrated).

When the chain gripper 330 configured as above drives a motor (not illustrated) connected with the first sprocket 330A, the first sprocket 330A rotates clockwise in FIG. 22 and the chain 330C runs. The gripper 330D transports paper P by holding the front edge of paper P passed from the transportation drum 320 and moving it along the running path of the chain 330C, and passes the paper to a paper discharge unit (not illustrated). Paper P is discharged in a paper discharge unit.

Moreover, the heating unit 334 and the guideboard 332 are provided for the transportation path of paper P with the chain gripper 330.

The guideboard 332 is a rectangular plate-like member and is formed such that the size thereof in the transportation direction of paper P is larger than the heating unit 334 and the size thereof in a direction orthogonal to the transportation direction of paper P is larger than the width of paper P. Moreover, the guideboard 332 has a smooth paper holding surface that holds paper P and is disposed such that the paper holding surface is separated by a certain distance from the chain 330C and faces the heating unit 334. A lot of adsorption holes (not illustrated) are installed on the paper holding surface, and the paper P transported by the chain gripper 330 is adsorbed to the paper holding surface.

The heating unit 334 is installed in a position opposite to the guideboard 332. The drying fixation unit 158 illustrated in FIG. 1 can be applied as the heating unit 334. The heating unit 334 heats the recording surface of paper P transported by the chain gripper 330 and dries and fixes an image recorded in the recording surface of paper P.

Even for the above-mentioned inkjet recording apparatus 300, it is possible to apply unevenness correction processing or the like using the nozzle-specific density measurement value conversion values of the first embodiment, the second embodiment and the third embodiment.

The technical scope of the present invention is not limited to the range described in the above-mentioned embodiments. The configurations or the like in respective embodiments can be arbitrarily combined in respective embodiments without departing from the spirit of the invention.

What is claimed is:

1. An image processing method comprising:
   a density unevenness measurement image formation step of forming an image for density unevenness measurement on a recording medium in a single-pass method, using an inkjet head in which nozzles are disposed in a main scanning direction, based on image data on which unevenness correction processing is performed using a preset unevenness correction value, and performing defect correction on the image data using a correction nozzle adjacent to a defective nozzle;
   a density measurement value acquisition step of acquiring a density measurement value for each of one or more set gradation values of the image for density unevenness measurement and each of the nozzles, before the image for density unevenness measurement is dried;
   a density measurement value conversion step of converting the acquired density measurement value into a conversion density measurement value corresponding to a post-dry density measurement value, using a defect correction unit density measurement value conversion value for a nozzle that corresponds to the correction nozzle and a non-defect correction unit density measurement value conversion value for a nozzle that does not correspond to the correction nozzle, where the defect correction unit density measurement value conversion value and the non-defect correction unit density measurement value conversion value show a conversion relationship of the density measurement value of each set gradation value before and after drying for each of the nozzles;
   an unevenness correction value derivation step of deriving a new unevenness correction value using the conversion density measurement value, and
   an unevenness correction processing step of performing unevenness correction processing on another image data based on the new unevenness correction value.

2. The image processing method according to claim 1, further comprising:
   a density measurement image formation step of forming an image for density measurement of each set gradation value on a recording medium in a single-pass method, using the inkjet head, based on image data on which unevenness correction processing is performed using a preset unevenness correction value, causing a predefined imitation defective nozzle not to eject ink and causing imitation correction nozzles adjacent to the imitation defective nozzle to eject ink of density for defective correction;

a pre-dry density measurement value acquisition step of acquiring a pre-dry density measurement value of each set gradation value of the image for density measurement before the image for density measurement is dried;

a drying step of drying the image for density measurement;

a post-dry density measurement value acquisition step of acquiring a post-dry density measurement value of each set gradation value of the image for density measurement after the image for density measurement is dried; and a defect correction unit density measurement value conversion value calculation step of calculating a defect correction unit density measurement value conversion value of each set gradation value for each of the imitation correction nozzles, based on the pre-dry density measurement value and the post-dry density measurement value.

3. The image processing method according to claim 1, further comprising:

a density measurement image formation step of forming an image for density measurement of each set gradation value on a recording medium in a single-pass method, using the inkjet head, based on image data on which unevenness correction processing is performed using a preset unevenness correction value;

a pre-dry density measurement value acquisition step of acquiring a pre-dry density measurement value of each set gradation value of the image for density measurement before the image for density measurement is dried;

a drying step of drying the image for density measurement;

a post-dry density measurement value acquisition step of acquiring a post-dry density measurement value of each set gradation value of the image for density measurement after the image for density measurement is dried; and a non-defect correction unit density measurement value conversion value calculation step of calculating a non-defect correction unit density measurement value conversion value of each set gradation value for each of the nozzles, based on the pre-dry density measurement value and the post-dry density measurement value.

4. The image processing method according to claim 1, wherein, in the density measurement value conversion step, the defect correction unit density measurement value conversion value is added to the acquired density measurement value for a nozzle that corresponds to the correction nozzle, the non-defect correction unit density measurement value conversion value is added to the acquired density measurement value for a nozzle that does not correspond to the correction nozzle, and conversion into a conversion density measurement value corresponding to a post-dry density measurement value is performed, where the defect correction unit density measurement value conversion value and the non-defect correction unit density measurement value conversion value show a conversion relationship of the density measurement value of each set gradation value before and after drying and each of the nozzles.

5. A non-transitory computer-readable recording medium including a program that causes a computer to execute steps of the image processing method according to claim 1.

* * * * *